(12) United States Patent
Ikeda et al.

(10) Patent No.: US 11,023,050 B2
(45) Date of Patent: Jun. 1, 2021

(54) DISPLAY CONTROL DEVICE, DISPLAY CONTROL METHOD, AND COMPUTER PROGRAM

(71) Applicant: SONY CORPORATION, Tokyo (JP)

(72) Inventors: Tetsuo Ikeda, Tokyo (JP); Tomohiro Ishii, Tokyo (JP); Kosuke Yoshitomi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/462,126

(22) PCT Filed: Oct. 12, 2017

(86) PCT No.: PCT/JP2017/036968
§ 371 (c)(1),
(2) Date: May 17, 2019

(87) PCT Pub. No.: WO2018/096827
PCT Pub. Date: May 31, 2018

(65) Prior Publication Data
US 2019/0286245 A1    Sep. 19, 2019

(30) Foreign Application Priority Data

Nov. 25, 2016 (JP) .............................. JP2016-228510

(51) Int. Cl.
*G06F 3/0484* (2013.01)
*G06F 3/01* (2006.01)
(Continued)

(52) U.S. Cl.
CPC ............ *G06F 3/017* (2013.01); *G06F 3/0484* (2013.01); *G06F 3/0488* (2013.01);
(Continued)

(58) Field of Classification Search
CPC .... G06F 3/017; G06F 3/0484; G06F 3/04842; G06F 3/0488
See application file for complete search history.

(56) References Cited

U.S. PATENT DOCUMENTS 9,448,634 B1 * 9/2016 Wakeford ............... G06F 3/017
2008/0165132 A1 * 7/2008 Weiss .................. G06F 3/04883
345/173

(Continued)

FOREIGN PATENT DOCUMENTS

JP    2004-164069 A    6/2004
JP    2004-272835 A    9/2004
(Continued)

*Primary Examiner* — David E Choi
(74) *Attorney, Agent, or Firm* — Paratus Law Group, PLLC

(57) ABSTRACT

There is provided a display control device capable of executing an operation corresponding to a gesture in consideration of a user's utilization state and intention, the display control device including: a determination unit that determines content of a gesture from an operation that has been performed on a display surface; and an effect decision unit that decides an effect with a defined direction in relation to display of an object displayed on the display surface and the object which is a target of the effect, that correspond to the gesture determined by the determination unit.

21 Claims, 32 Drawing Sheets

(51) Int. Cl.
*G06F 3/0488* (2013.01)
*G09G 5/00* (2006.01)
*G09G 5/36* (2006.01)
*A63F 13/213* (2014.01)
*A63F 13/2145* (2014.01)
*A63F 13/428* (2014.01)

(52) U.S. Cl.
CPC ........... *G06F 3/04842* (2013.01); *G09G 5/00* (2013.01); *G09G 5/36* (2013.01); *A63F 13/213* (2014.09); *A63F 13/2145* (2014.09); *A63F 13/428* (2014.09)

(56) References Cited

U.S. PATENT DOCUMENTS

| | | | | |
|---|---|---|---|---|
| 2012/0299845 A1* | 11/2012 | Seo | ................. | G06F 3/1423 345/173 |
| 2013/0069860 A1* | 3/2013 | Davidson | .............. | G06F 3/0488 345/156 |
| 2013/0246861 A1* | 9/2013 | Colley | ................. | G06F 3/0418 714/48 |
| 2014/0007225 A1* | 1/2014 | Gay | .................. | G06F 21/40 726/19 |
| 2014/0101578 A1* | 4/2014 | Kwak | ................ | G06F 1/1647 715/761 |
| 2014/0149901 A1* | 5/2014 | Hunter | ................ | G06F 3/017 715/765 |
| 2014/0304651 A1* | 10/2014 | Johansson | ............. | G06F 3/0482 715/810 |
| 2014/0359538 A1* | 12/2014 | Thakur | ................ | G06F 3/0486 715/863 |
| 2015/0026569 A1* | 1/2015 | Lee | .................. | G06F 3/016 715/256 |
| 2015/0082213 A1* | 3/2015 | Ueda | ................. | G06F 3/04886 715/764 |
| 2015/0370414 A1* | 12/2015 | Innami | ................. | G06F 3/0418 715/773 |
| 2016/0054849 A1* | 2/2016 | Steiger | ................. | G06F 3/0416 345/173 |
| 2016/0057270 A1* | 2/2016 | Kazanchian | ...... | H04M 1/72572 455/419 |
| 2016/0224203 A1* | 8/2016 | Taylor | ................. | G06F 3/04883 |
| 2017/0060821 A1* | 3/2017 | Rucine | ................. | G06F 40/106 |
| 2017/0131879 A1* | 5/2017 | Lee | .................. | G06F 1/1652 |
| 2017/0249015 A1* | 8/2017 | Kang | ................. | G06T 19/20 |
| 2019/0286245 A1* | 9/2019 | Ikeda | .................... | G06F 3/0484 |

FOREIGN PATENT DOCUMENTS

| | | |
|---|---|---|
| JP | 2006-011914 A | 1/2006 |
| JP | 2009-064109 A | 3/2009 |
| JP | 2013-125551 A | 6/2013 |
| JP | 2013-186540 A | 9/2013 |
| JP | 2015-060554 A | 3/2015 |
| JP | 2016-051436 A | 4/2016 |
| JP | 2016-515741 A | 5/2016 |
| WO | WO 2006/017695 A2 | 2/2006 |
| WO | WO 2015/198729 A1 | 12/2015 |

* cited by examiner

FIG. 6
| GESTURE | NUMBER OF FINGERS | RECOGNITION PATTERN MASK | EFFECT | | | TARGET |
|---|---|---|---|---|---|---|
| | | | POSITION | SIZE | ROTATION | |
|  | ONE |  | ○ | | ○ | WITHIN RANGE OF TRAJECTORY |
|  | TWO |  | ○ | | ○ | ENTIRE SCREEN |
| 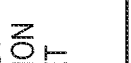 | ONE | 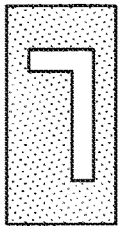 | ○ | ○ | ○ | CLOSEST OPERATION TARGET |

DISPLAY CONTROL DEVICE, DISPLAY CONTROL METHOD, AND COMPUTER PROGRAM

CROSS REFERENCE TO PRIOR APPLICATION

This application is a National Stage Patent Application of PCT International Patent Application No. PCT/JP2017/036968 (filed on Oct. 12, 2017) under 35 U.S.C. § 371, which claims priority to Japanese Patent Application No. 2016-228510 (filed on Nov. 25, 2016), which are all hereby incorporated by reference in their entirety.

TECHNICAL FIELD

The present disclosure relates to a display control device, a display control method, and a computer program.

BACKGROUND ART

There is a technology for performing an operation in accordance with a predefined pattern (gesture) if a user's operation conforms to the pattern. For example, Patent Document 1 discloses a technology for defining the size of a window in accordance with a size of a gesture of drawing a rectangle or a circle with his/her finger, a pen, or the like when a user performs a gesture.

CITATION LIST

Patent Literature

Patent Literature 1: JP 2004-272835A

SUMMARY OF INVENTION

Technical Problem

According to an existing technology for recognizing a gesture and performing an operation corresponding to the gesture, a direction used by the user is limited to forwards from a display and a downward direction in the vertical direction. Therefore, utilization from other directions is not taken into consideration.

Thus, the disclosure proposes a novel and improved display control device, display control method, and computer program capable of executing an operation corresponding to a gesture in consideration of a user's utilization state and intention.

Solution to Problem

According to an aspect of the disclosure, there is provided a display control device including: a determination unit that determines content of a gesture from an operation that has been performed on a display surface; and an effect decision unit that decides an effect with a defined direction in relation to display of an object displayed on the display surface and the object which is a target of the effect, that correspond to the gesture determined by the determination unit.

According to another aspect of the disclosure, there is provided a display control method including: determining, by a processor, content of a gesture from an operation that has been performed on a display surface; and deciding, by the processor, an effect with a defined direction in relation to display of an object displayed on the display surface and the object which is a target of the effect, that correspond to the determined gesture.

According to yet another aspect of the disclosure, there is provided a computer program including: causing a computer to determine content of a gesture from an operation that has been performed on a display surface; and causing a computer to decide an effect with a defined direction in relation to display of an object displayed on the display surface and the object which is a target of the effect, that correspond to the determined gesture.

Advantageous Effects of Invention

According to the disclosure, it is possible to provide a novel and improved display control device, display control method, and computer program capable of executing an operation corresponding to a gesture in consideration of a user's utilization state and intention as described above.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 explanatory diagram illustrating an example of information that a gesture definition accumulation unit 210 accumulates.

DESCRIPTION OF EMBODIMENTS

Figure 1:
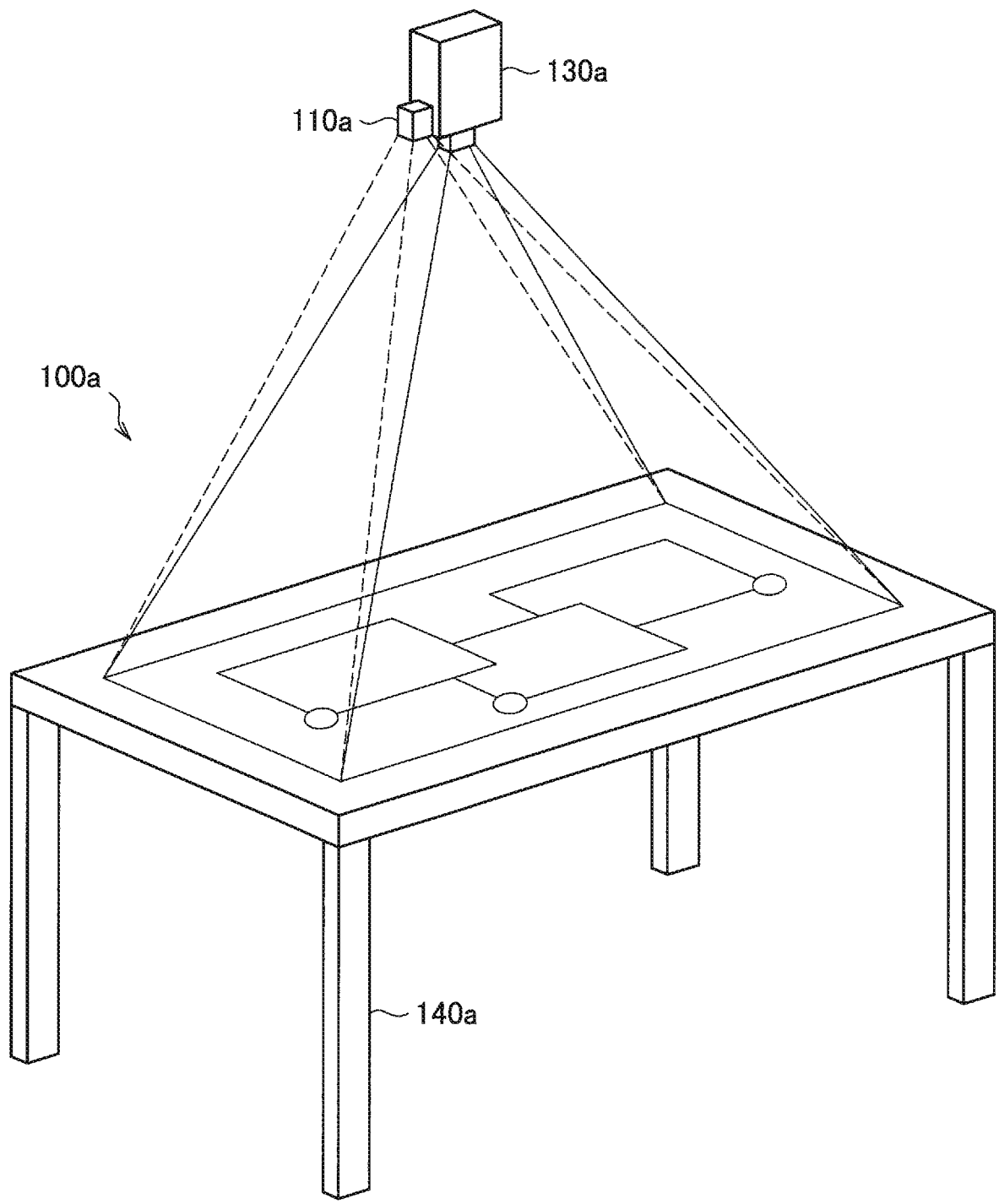
FIG. 1 is an explanatory diagram illustrating a configuration example of an information processing system according to an embodiment of the disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. Embodiment of the disclosure
1.1. System configuration example
1.2. Functional configuration example
1.3. Operation example
2. Hardware configuration example
3. Conclusion 1. Embodiment of the Disclosure

[1.1. System Configuration Example]

First, a configuration example of an information processing system according to an embodiment of the disclosure will be described.

FIG. 1 is an explanatory diagram illustrating a configuration example of an information processing system according to an embodiment of the disclosure. Note that in the specification, the system may mean a configuration that executes predetermined processing, and the entire system can be regarded as one device, or it is also possible to conceive that the system includes a plurality of devices. It is only necessary for the information processing system according to the embodiment illustrated in FIG. 1 to be configured to be able to execute predetermined processing as a whole, and which constituent in the information processing system is to be regarded as one device may be arbitrarily decided.

Referring to FIG. 1, an information processing system 100a according to an embodiment of the disclosure includes an input unit 110a and an output unit 130a.

The output unit 130a provides a visual notification of various kinds of information to a user by displaying the information in a table 140a. As the output unit 130a, a projector is used, for example. As illustrated in the drawing, the output unit 130a is disposed above the table 140a at a predetermined distance away from the table 140a in a state in which the output unit 130a is suspended from a ceiling, for example, and projects information on a top surface of the table 140a. Such a scheme of displaying information on the top surface of the table 140a from above is also referred to as a "projection type".

Note that in the following description, an entire region in which the information is displayed by the output unit 130a is also referred to as a display screen. For example, the output unit 130a displays, on the display screen, information to be presented to the user in response to execution of an application by the information processing system 100a. The information to be displayed is, for example, an operation screen for each application. Hereinafter, each display region on the display screen in which such an operation screen for an application is displayed will also be referred to as a window. Also, the output unit 130a displays so-called graphical user interface (GUI) components (widgets) that receive various user's operations such as selection and input through a button, a slider, a check box, a text box, and a keyboard on the display screen, for example. Although it is possible to regard the window as one of the GUI components, the window will not be included in the GUI components, and display elements other than the window will be referred to as the GUI components in this specification for convenience in order to distinguish the window from the other GUI components.

Here, in a case in which the information processing system 100a is of a projection type, the output unit 130a may include an illumination device. In a case in which an illumination device is included in the output unit 130a, the information processing system 100a may control a state of the illumination device, such as ON and OFF, on the basis of content of information input by the input unit 110a and/or content of information displayed by the output unit 130a.

Also, the output unit 130a may include a speaker and output various kinds of information as sound. In a case in which the output unit 130a is formed as a speaker, the number of speakers may be one, or a plurality of speakers may be provided. In a case in which the output unit 130a includes a plurality of speakers, the information processing system 100a may limit the speakers that output sound or may adjust a direction in which the sound is output.

The input unit 110a is a device that inputs content of an operation performed by the user who uses the information processing system 100a. In the example illustrated in FIG. 1, the input unit 110a includes a sensor and the like and is provided above the table 140a in a state in which the input unit 110a is suspended from the ceiling, for example. In this manner, the input unit 110a is provided away from the table 140a that is a target on which information is displayed. The input unit 110a can include an imaging device capable of imaging the top surface of the table 140a, that is, the display screen. As the input unit 110a, a camera that images the table 140a with one lens, a stereo camera capable of imaging the table 140a with two lenses and recording information in the perspective direction, or the like can be used, for example. In a case in which the input unit 110a is a stereo camera, a visible light camera, an infrared camera, or the like can be used.

In a case in which a camera that images the table 140a with one lens is used as the input unit 110a, the information processing system 100a can detect the position of an object, for example, a user's hand located on the table 140a by analyzing an image (captured image) captured by the camera. Also, in a case in which a stereo camera is used as the input unit 110a, the information processing system 100a can acquire depth information of a body located on the table 140a in addition to position information of the body by analyzing an image captured by the stereo camera. The information processing system 100a can detect contact or approach of the user's hand relative to the table 140a in a height direction and separation of the hand from the table 140a on the basis of the depth information. Note that in the following description, the user's action of bringing an operation member such as his/her hand into contact with the information on the display screen or causing the operation member to approach the information on the screen will also simply and collectively be referred to as "contact".

In the embodiment, the position of the operation member, for example, the user's hand on the display screen (that is, on the top surface of the table 140a) is detected on the basis of the image captured by the input unit 110a, and various kinds of information are input on the basis of the detected position of the operation member. That is, the user can input various operations by moving the operation member on the display screen. For example, an operation may be input to the window or another GUI component by contact of the user's hand with the window or another GUI component being detected. Note that in the following description, although a case in which the user's hand is used as the operation member will be described below as an example, the embodiment is not limited to such an example, and various operation members such as a stylus may be used as the operation member.

Also, in a case in which the input unit 110a includes an imaging device, the input unit 110a may image not only the top surface of the table 140a but also a user who is present in the surroundings of the table 140a. For example, the information processing system 100a can detect the position of a user in the surroundings of the table 140a on the basis of the captured image. Also, the information processing system 100a may perform individual recognition for the user by extracting body features with which individual users can be identified, such as a size of a user's face or body included in the captured image.

Here, the embodiment is not limited to such an example, and the user's operation input may be executed by another method. For example, the input unit 110a may be provided as a touch panel on the top surface of the table 140a, and the user's operation input may be detected by contact of a user's finger or the like with the touch panel. Also, the user's operation input may be detected using a gesture performed with respect to the imaging device that forms the input unit 110a. Alternatively, the input unit 110a may include a sound input device such as a microphone that collects speech that the user generates or ambient sound from the surrounding environment. As the sound input device, a microphone array for collecting sound in a specific direction may suitably be used. In addition, the microphone array may be configured such that the sound collecting direction can be adjusted to an arbitrary direction. In a case in which a sound input device is used as the input unit 110a, an operation may be input through the collected sound. Also, the information processing system 100a may recognize an individual on the basis of the sound by analyzing the collected sound. Alternatively, the input unit 110a may include a remote control device (a so-called remote). The remote may be configured such that a predetermined command is input by operating a predetermined button disposed on the remote, or may be configured such that a predetermined command is input through a user's operation of moving the remote by detecting motion and an attitude of the remote with a sensor such as an acceleration sensor or a gyro sensor mounted on the remote. Further, the information processing system 100a may include other input devices, such as a mouse, a keyboard, a button, a switch, and a lever, which are not illustrated in the drawing, as the input unit 110a, and user's operations may be input through such input devices.

The configuration of the information processing system 100a according to the embodiment has been described above with reference to FIG. 1. Note that although not illustrated in FIG. 1, other devices may be connected to the information processing system 100a. For example, an illumination device for illuminating the table 140a may be connected to the information processing system 100a. The information processing system 100a may control an ON state of the illumination device in accordance with a state of the display screen.

Figure 2:
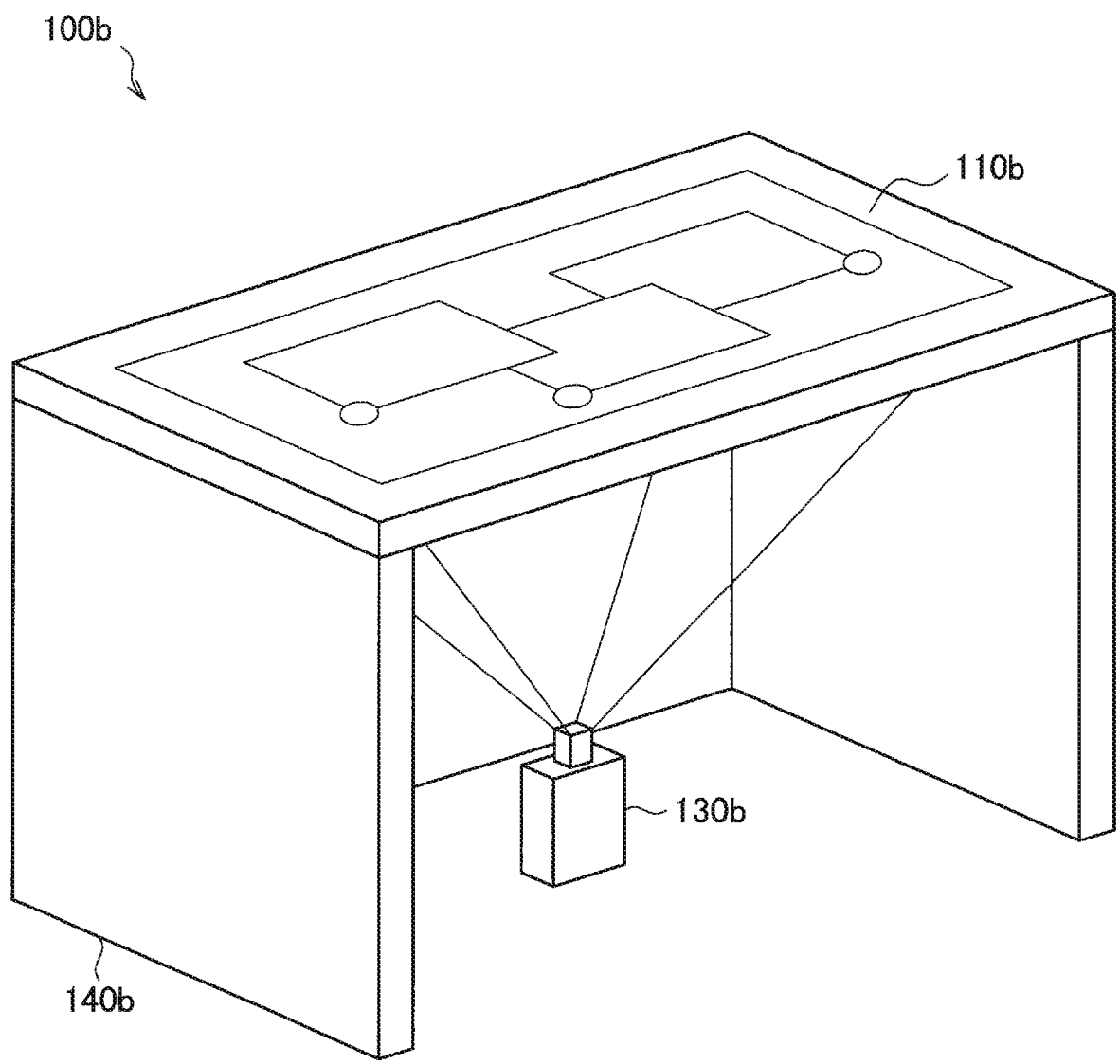
FIG. 2 is a diagram illustrating another configuration example of the information processing system according to the embodiment.
Figure 3:
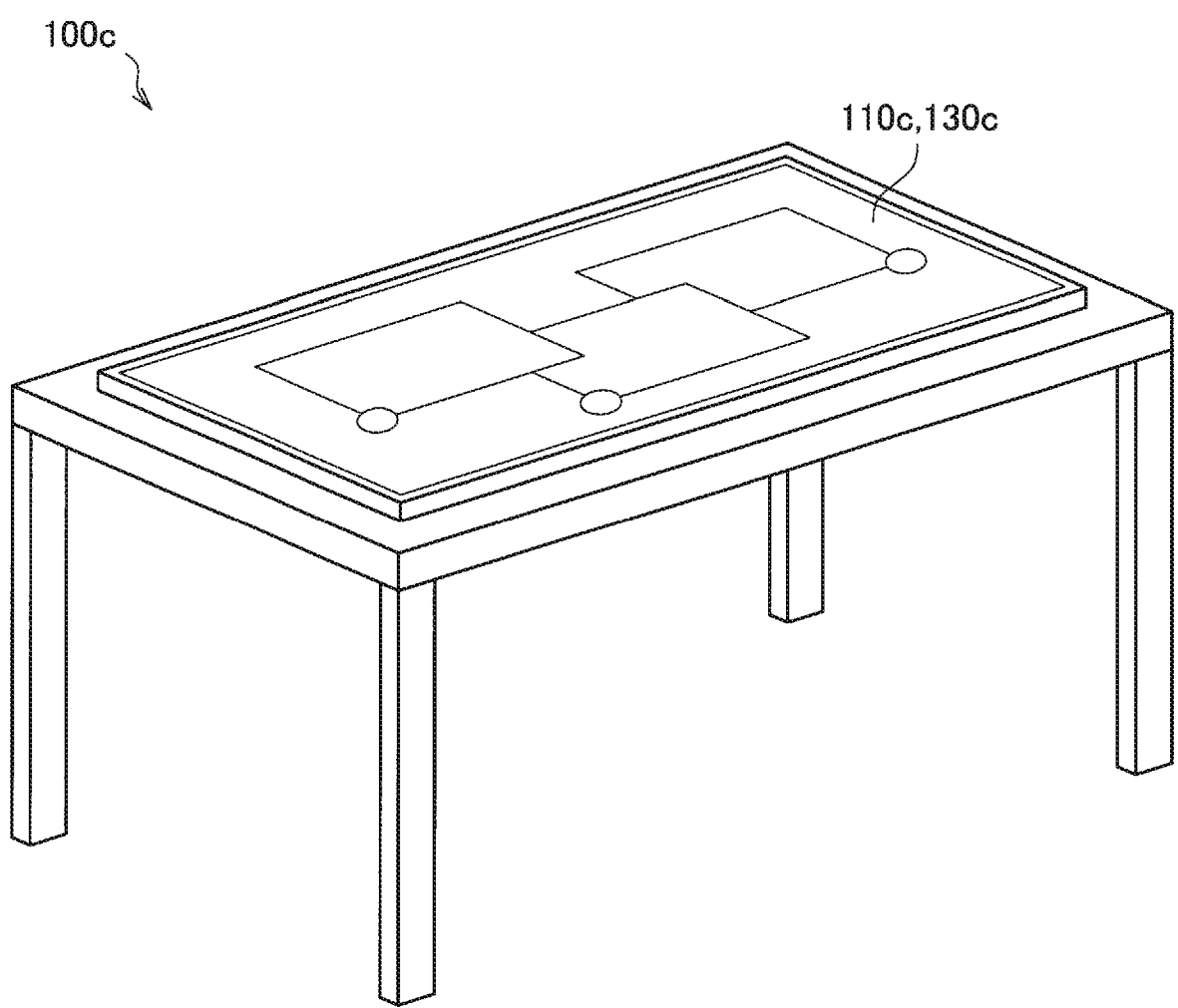
FIG. 3 is a diagram illustrating another configuration example of the information processing system according to the embodiment.
Figure 4:
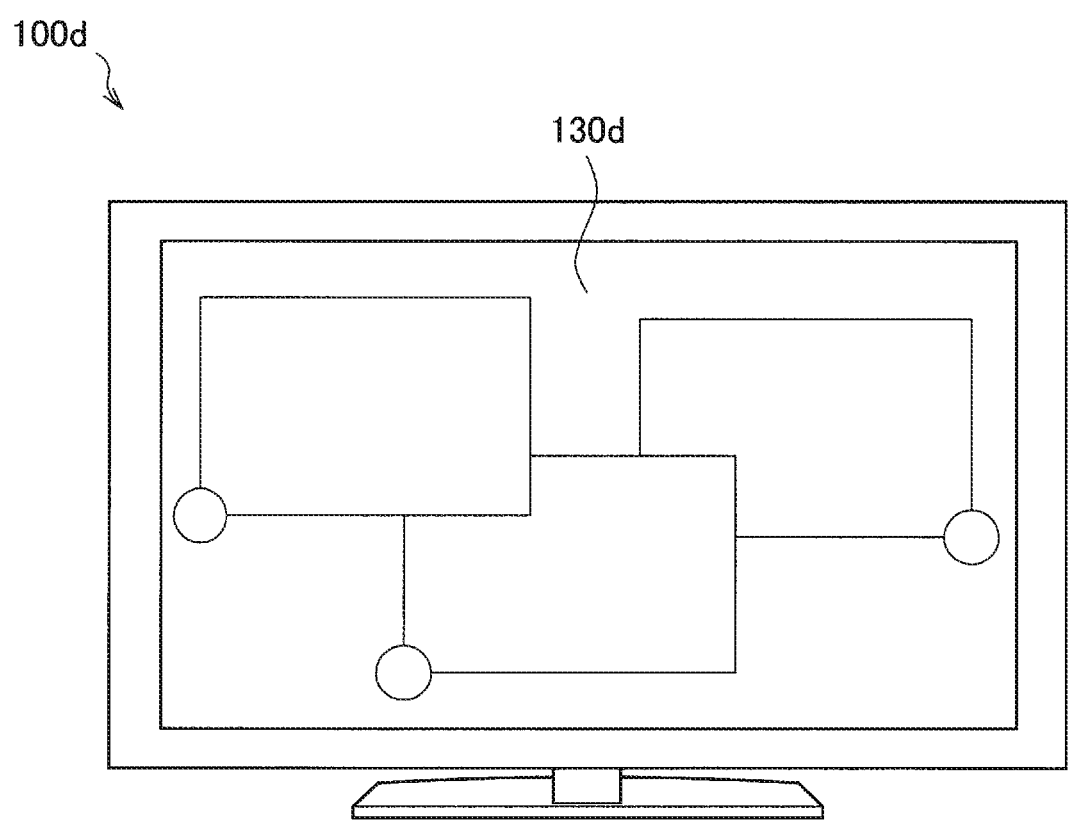
FIG. 4 is a diagram illustrating another configuration example of the information processing system according to the embodiment.

Here, the configuration of the information processing system is not limited to that illustrated in FIG. 1 in the embodiment. It is only necessary for the information processing system according to the embodiment to include the output unit that displays various kinds of information on the display screen and the input unit capable of receiving at least an operation input performed on the displayed information, and a specific configuration thereof is not limited. Referring to FIGS. 2 to 4, other configuration examples of the information processing system according to the embodiment will be described. FIGS. 2 to 4 are diagrams illustrating other configuration examples of the information processing system according to the embodiment.

In an information processing system 100b illustrated in FIG. 2, an output unit 130a is provided below a table 140b. The output unit 130a is a projector, for example, and projects information from the lower side toward the top plate of the table 140b. The top plate of the table 140b includes a transparent material, such as a glass plate or a transparent plastic plate, for example, and information projected by the output unit 130a is displayed on the top surface of the table 140b. Such a scheme of projecting information from the side below the table 140b to the output unit 130a and displaying information on the top surface of the table 140b will also be referred to as a "rear projection type".

In the example illustrated in FIG. 2, an input unit 110b is provided on the top surface (front surface) of the table 140b. The input unit 110b includes a touch panel, for example, and a user inputs an operation by contact of an operation member with the display screen on the top surface of the table 140b being detected by the touch panel. Note that the configuration of the input unit 110b is not limited to such an example, and the input unit 110b may be provided away from the table 140b below the table 140b similarly to the information processing system 100a illustrated in FIG. 1. In this case, the input unit 110b includes an imaging device, for example, and can detect the position of the operation member on the top surface of the table 140b through the top plate including the transparent material.

In the information processing system 100c illustrated in FIG. 3, a touch panel-type display is mounted on the table in a state in which the display surface thereof is directed upward. In the information processing system 100c, the input unit 110c and the output unit 130c may be integrally formed as a display of the touch panel type. That is, the user inputs an operation by various kinds of information being displayed on the display screen of the display and contact of the operation member with the display screen of the display being detected through the touch panel. Note that the imaging device may also be provided as the input unit 110c above the touch panel-type display in the information processing system 100c similarly to the information processing system 100a illustrated in FIG. 1. The position or the like of the user in the surroundings of the table may be detected by the imaging device.

An information processing system 100d illustrated in FIG. 4 includes a flat panel-type display. In the information processing system 100d, the output unit 130d is formed as a flat panel-type display, and various kinds of information is displayed on a display screen of the display. An input unit includes input devices such as a mouse, a keyboard, and a touch pad, which are not illustrated in the drawing, and the user inputs an operation by operating a pointer in the display screen using these input devices. Note that the input unit in the information processing system 100d may include a touch panel provided on the flat panel-type display, and the user may input an operation through the touch panel similarly to the information processing system 100c illustrated in FIG. 3. Also, the input unit may include an imaging device capable of imaging a region that faces the display surface of the flat panel-type display. The position and the like of the user who observes the flat panel-type display may be detected using the imaging device.

Other configurations of the information processing system according to the embodiment have been described above with reference to FIGS. 2 to 4. As described above, the information processing system according to the embodiment may be realized in a variety of configurations. Here, the embodiment will be described below by exemplifying a configuration of the information processing system 100a in which the input unit 110a and the output unit 130a are provided above the table 140a as illustrated in FIG. 1. However, another configuration capable of realizing the information processing system according to the embodiment, such as the aforementioned configurations illustrated in FIGS. 2 to 4, can also realize functions that are similar to those described below. In the following description, the information processing system 100a, the input unit 110a, and the output unit 130a will simply be referred to as an information processing system 100, an input unit 110, and an output unit 130 for simplification.

The configuration examples of the information processing system 100 according to the embodiment of the disclosure have been described above. Next, functional configuration examples of the information processing system 100 according to the embodiment of the disclosure will be described.

[1.2. Functional Configuration Example]

Figure 5:
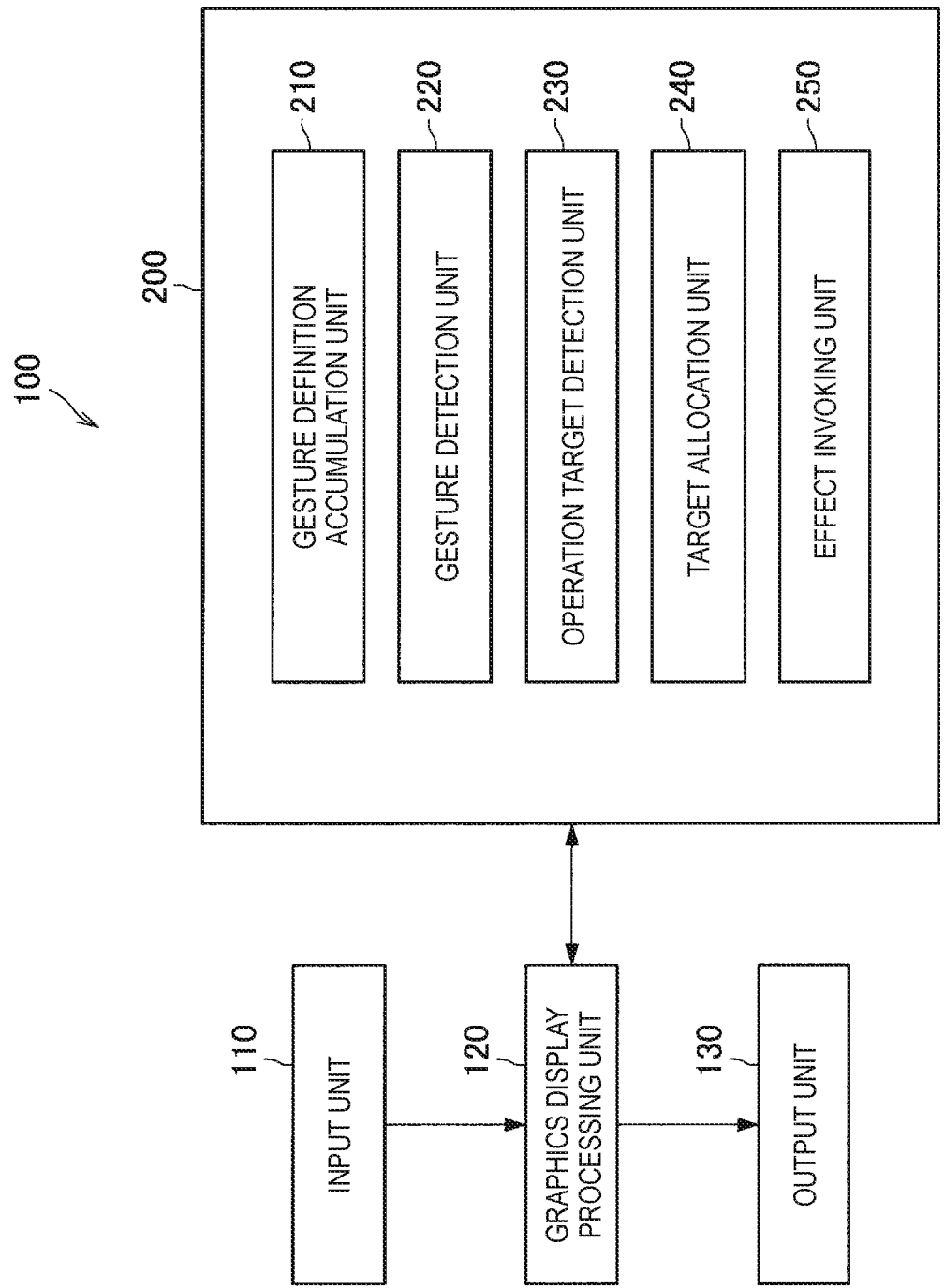
FIG. 5 is an explanatory diagram illustrating a functional configuration example of an information processing system 100 according to the embodiment.

FIG. 5 is an explanatory diagram illustrating a functional configuration example of the information processing system 100 according to the embodiment of the disclosure. Hereinafter, a functional configuration of the information processing system 100 according to the embodiment of the disclosure will be described with reference to FIG. 5.

As illustrated in FIG. 5, the information processing system 100 according to the embodiment of the disclosure includes the input unit 1110, a graphics display processing unit 120, the output unit 130, and a display control unit 200.

The input unit 110 is an input interface for inputting various kinds of information to the information processing system 100. The user can input various kinds of information to the information processing system 100 via the input unit 110. In the embodiment, the input unit 110 is configured to be able to receive at least a user's operation input to the display screen generated by the output unit 130. For example, the input unit 110 includes an imaging device including an image sensor and captures a captured image including an operation member such as a user's hand on the display screen. Information input via the input unit 110 (information or the like regarding the captured image, for example) is provided to the display control unit 200, which will be described later, and the user's operation input is detected by the display control unit 200. Note that the embodiment is not limited to such an example, and the input unit 110 may include other input devices such as a touch panel, a mouse, a keyboard, a microphone, a button, a switch, and a lever, for example.

The graphics display processing unit 120 performs processing of graphics to be displayed on the output unit 130 on the basis of the user's operation input that the input unit 110 receives. The graphics display processing unit 120 performs, for example, drawing control of a variety of content in a window or the like that displays an application, provision of an event such as a user's operation input to each content, and the like. In the embodiment, the graphics display control unit 120 provides content of the user's operation input received from the input unit 110 to the display control unit 200. Then, the graphics display processing unit 120 receives the content of the processing performed by the display control unit 200 and executes graphics processing based on the content. The graphics display processing unit 120 includes an image processing circuit, for example.

The output unit 130 is an output interface for providing a notification of various kinds of information processed by the information processing system 100 to the user. The output unit 130 includes a display device such as a display or a projector and displays various kinds of information on the display screen wider control from the display control unit 200, which will be described later. The output unit 130 displays the window and the GUI components on the display screen as described above. The window, the GUI components, and the like displayed on the display unit 130 are also referred to as "objects". Note that the embodiment is not limited to such an example, and the output unit 130 may further include a sound output device such as a speaker and may output various kinds of information through sound.

The display control unit 200 executes processing based on the user's operation input that the input unit 110 receives. In the embodiment, the display control unit 200 detects a gesture on the basis of the user's operation input that the input unit 110 receives and executes processing of providing an effect based on the gesture to the object. The display control unit 200 includes a memory that stores a program therein for causing a control circuit such as a CPU and a control circuit to operate, for example.

The display control unit 200 includes a gesture definition accumulation unit 210, a gesture detection unit 220, an operation target detection unit 230, a target allocation unit 240, and an effect invoking unit 250.

The gesture definition accumulation unit 210 stores a definition for recognizing the user's operation input that the input unit 110 receives as a gesture in a predetermined format. FIG. 6 is explanatory diagram illustrating an example of information that the gesture definition accumulation unit 210 accumulates. In FIG. 6, the number of fingers, a recognition pattern mask, which will be described later, an effect, a definition of a target are defined for three types of gestures. In regard to the effect, three types, namely the position, the size, and the rotation are defined, and the circle means that the effect marked with the circle is exhibited in response to the gesture.

The gesture illustrated in the upper section is drawing one line that is close to a straight line with one of user's fingers. The gesture is displayed by the output unit 130 as will be described later and is for aligning objects that are present within a range of the line along the line. Therefore, the object may be rotated and moved while the size is not changed in response to the gesture illustrated in the upper section. Therefore, only "position" and "rotation" are marked with circles in the line of "effect" for the gesture illustrated in the upper section as illustrated in FIG. 6.

The gesture illustrated in the middle section is drawing one line that is close to a straight line with two of user's fingers. The gesture is displayed by the output unit 130 as will be described later and is for aligning all objects along the line. Therefore, the object may be rotated and moved while the size is not changed in response to the gesture illustrated in the middle section. Therefore, only "position" and "rotation" are marked with circles in the line of "effect" for the gesture illustrated in the middle section as illustrated in FIG. 6.

The gesture illustrated in the lower section is drawing a line in a certain direction with one of user's fingers and then further drawing a line in a vertical line relative to the direction. In other words, the gesture illustrated in the lower section is user's drawing of a letter "L". This gesture is for disposing an object that is the closest to the user's operation position, for example, among objects displayed by the output unit 130 along the line as will be described later. Rotation, a size change, and movement of the object may be performed through the gesture illustrated in the lower section. Therefore, all "position", "size", and "rotation" in the line of "effect" are marked with circles for the gesture in the lower section as illustrated in FIG. 6.

Note that although the definitions of the three types of gestures are illustrated in FIG. 6, gestures that the information processing system 100 can interpret are not limited to such examples.

The gesture detection unit 220 detects whether or not a gesture has been established using the user's operation input that the input unit 110 receives. In the embodiment, the gesture detection unit 220 detects whether or not a gesture has been established through matching with recognition pattern masks accumulated in the gesture definition accumulation unit 210.

Figure 7A:
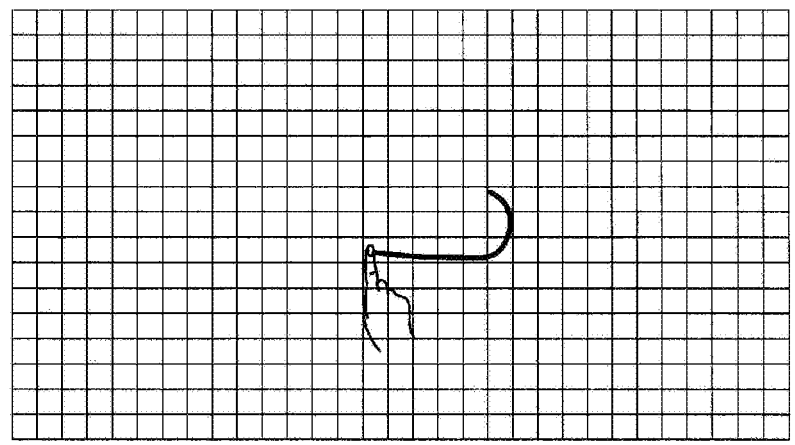
FIG. 7A is an explanatory diagram illustrating an example of a gesture detection method using a gesture detection unit 220.

FIGS. 7A to 7D are explanatory diagrams illustrating an example of a gesture detection method using a gesture detection unit 220. FIG. 7A is an explanatory diagram illustrating an example in which the user has performed an operation corresponding to a certain gesture on the display screen. FIG. 7A illustrates a state in which the user has moved one of his/her fingers on the display screen to draw an inverted "L" letter.

Figure 7B:
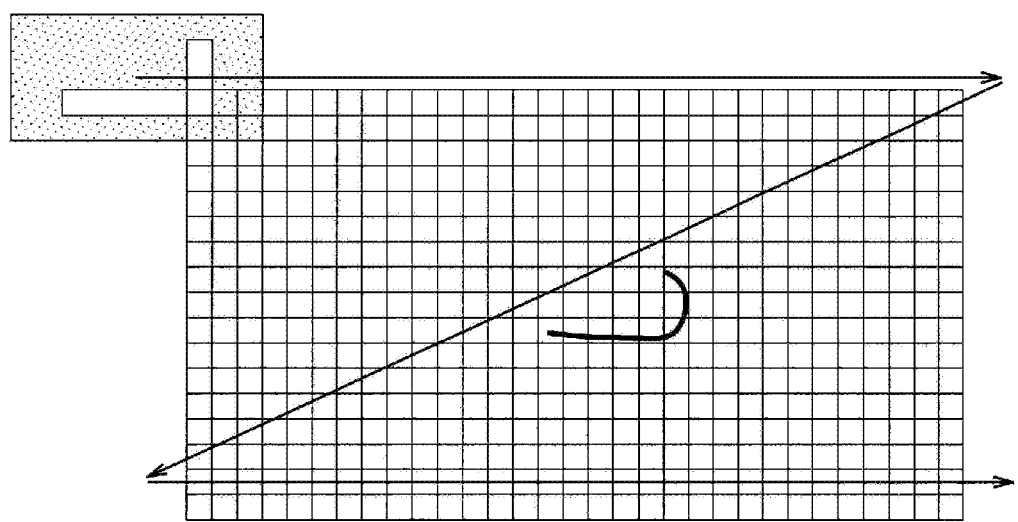
FIG. 7B is an explanatory diagram illustrating an example of a gesture detection method using a gesture detection unit 220.
Figure 7C:
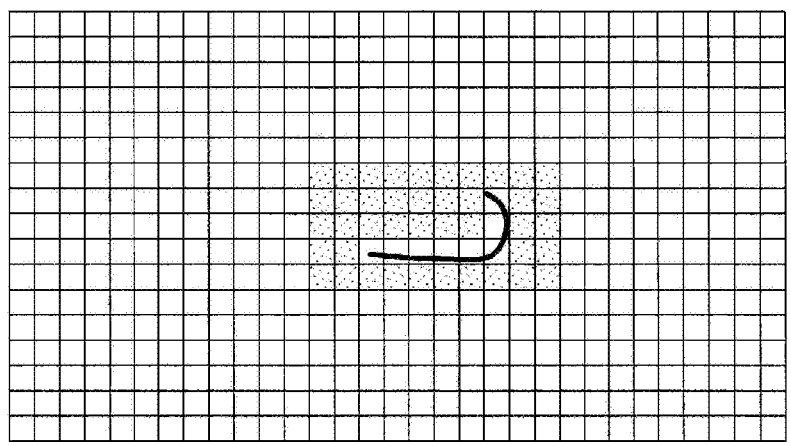
FIG. 7C is an explanatory diagram illustrating an example of a gesture detection method using a gesture detection unit 220.
Figure 7D:
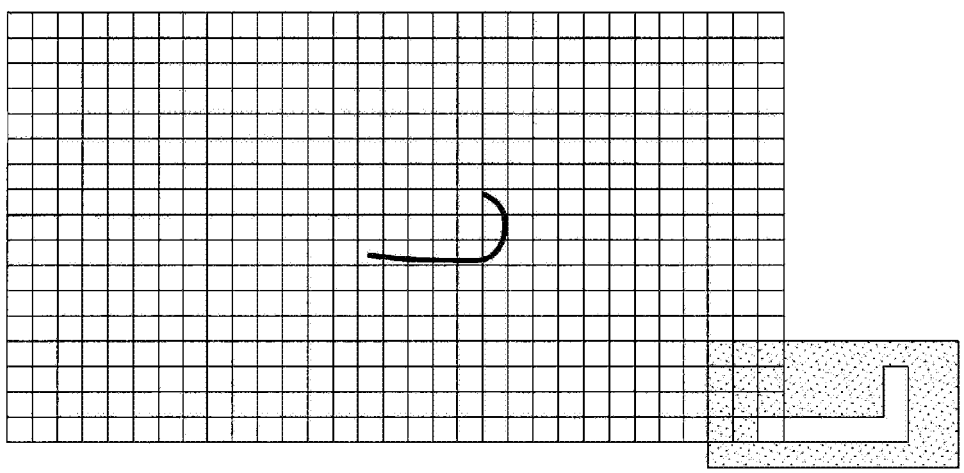
FIG. 7D is an explanatory diagram illustrating an example of a gesture detection method using a gesture detection unit 220.

FIGS. 7B to 7D illustrate gesture detection processing using a recognition pattern mask performed by the gesture detection unit 220. The gesture detection unit 20 causes a recognition pattern mask to be scanned from the upper left side to the right side on the display screen first as illustrated in FIG. 7B, and if scanning up to the right end is completed, a recognition pattern mask in the next row is caused to be scanned from the left side to the right side. Then, if the gesture detection unit 220 finally causes the recognition pattern mask to be scanned up to the lower right side on the display screen as illustrated in FIG. 7D, it is determined whether or not there is a location at which the operation that the user has performed conforms to the recognition pattern mask at a predetermined proportion or greater. For example, if the operation that the user has performed conforms to the recognition pattern mask at a predetermined proportion or greater as illustrated in FIG. 7C, the gesture detection unit 220 can determine that the user has performed a gesture corresponding to the recognition pattern mask. Note that when the user draws an "L"-shaped-line, the angle between the two lines forming the letter "L" may not exactly be 90 degrees. For example, the gesture detection unit 220 can determine that the user has drawn the "L"-shaped line using the recognition pattern mask even if the angle between the two lines forming the letter "L" is within a predetermined angular range such as from 85 degrees to 95 degrees.

Note that although the gesture detection unit 220 detects whether or not the gesture has been established through the matching with the recognition pattern mask in the embodiment, the disclosure is not limited to such an example. For example, the gesture detection unit 220 may detect whether or not the gesture has been established by successively tracking motion of the user's finger. Also, the gesture detection unit 220 may detect whether or not the gesture has been established on the basis of a habit or the like in gestures of each user learned through machine learning, for example.

The operation target detection unit 230 detects which of the objects on the display screen receives an effect of the gesture that the user has performed. Hereinafter, operations of the operation target detection unit 230 will be described with reference to a specific example. Note that the line that the user has drawn may or may not be drawn on the actual display surface. In a case in which the line that the user has drawn is drawn, the lines may be deleted after elapse of a predetermined time. When the line is deleted, the lines may instantaneously be deleted or may gradually be deleted. When the line is gradually deleted, the line may be successively deleted in the order from the part drawn earlier. It is assumed that the trajectory of the line that the user has drawn using his/her finger is drawn in the drawings used in the following description for convenience.

(1) User Draws One Line with One of His/Her Fingers

Figure 8A:
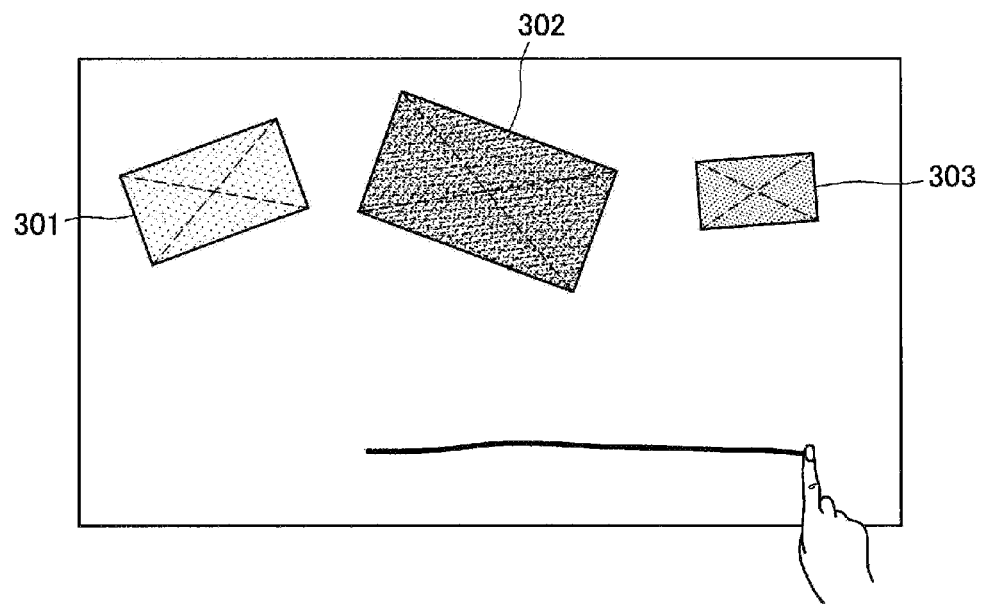
FIG. 8A is an explanatory diagram illustrating a state in which a user has performed a gesture of drawing a single line on a display surface with one of his/her fingers.
Figure 8B:
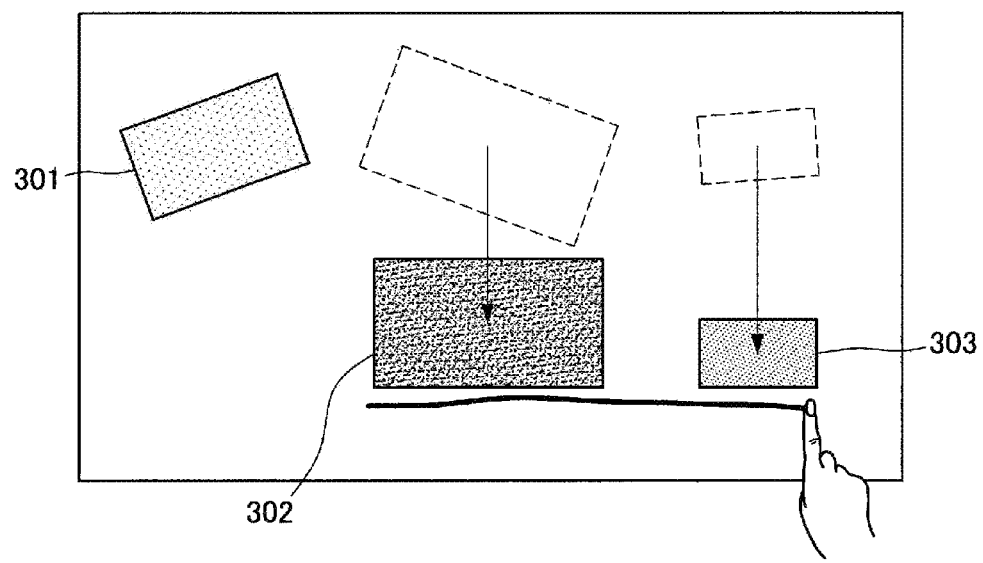
FIG. 8B is an explanatory diagram illustrating a state in which a user has performed a gesture of drawing a single line on a display surface with one of his/her fingers.

In the embodiment, a user's gesture of drawing one line with one of his/her fingers is displayed on the display screen by the output unit 130 and is for aligning objects that are present within the range of the line along the line. FIGS. 8A and 8B are explanatory diagrams illustrating a state in which the user has performed a gesture of drawing one line on a display surface with one of his/her fingers. If the user performs this gesture, windows 302 and 303 among windows 301 to 303 randomly aligned as illustrated in FIG. 8A are aligned along the line that the user has drawn as illustrated in FIG. 8B. Note that the drawing of the windows may be performed by the graphics display processing unit 120. When the windows are aligned, the respective windows are aligned such that sides that are close to the line are located on the lower side. The windows 302 and 303 are rotated as needed. If the user performs this gesture, the operation target detection unit 230 regards the line that the user has drawn as a straight line and detects a window with a gravity center on the vertical line of the straight line as a target of the effect.

Figure 8C:
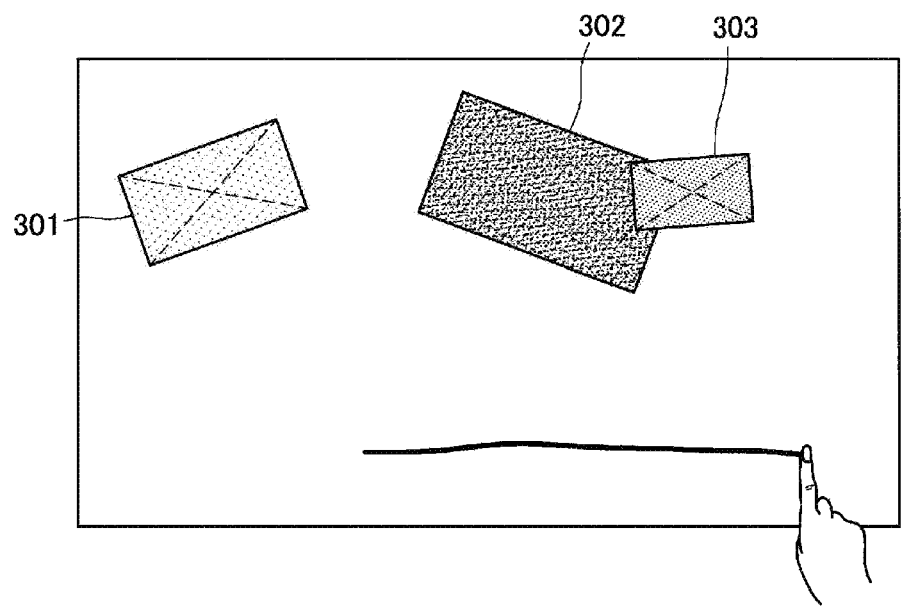
FIG. 8C is an explanatory diagram illustrating a state in which a user has performed a gesture of drawing a single line on a display surface with one of his/her fingers.
Figure 8D:
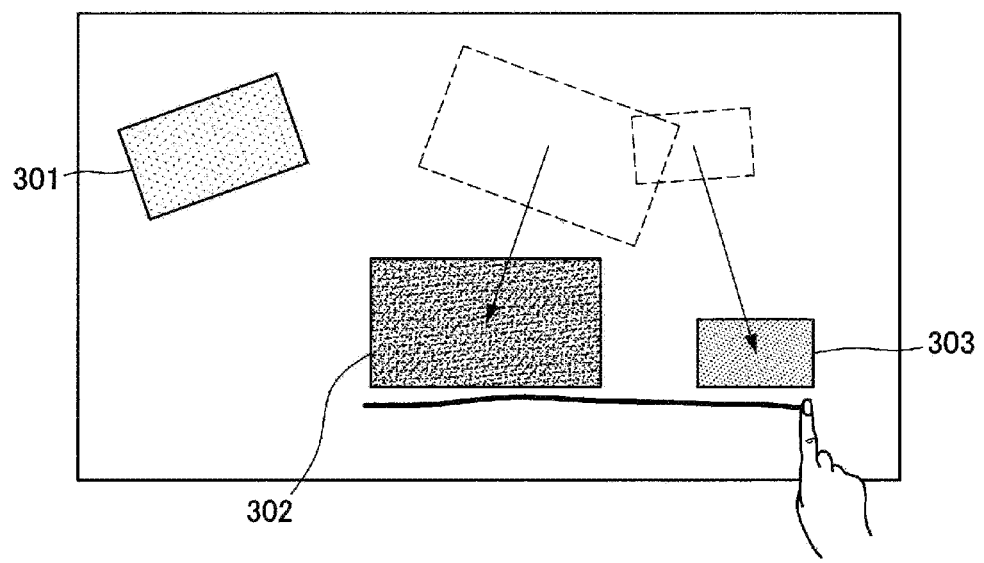
FIG. 8D is an explanatory diagram illustrating a state in which a user has performed a gesture of drawing a single line on a display surface with one of his/her fingers.

Note that in a case in which target windows are displayed in an overlapping manner, the windows may not be aligned in an overlapping manner when windows are aligned in accordance with the user's gesture of drawing one line with one of the user's fingers. FIGS. 8C and 8D are explanatory diagrams illustrating a state in which the user has performed a gesture of drawing one line on a display surface with one of his/her fingers. In the example, a state in which the windows 302 and 303 displayed in an overlapping manner as illustrated in FIG. 8C are aligned such that the windows 302 and 303 do not overlap each other through the gesture as illustrated in FIG. 8D is illustrated.

Figure 8E:
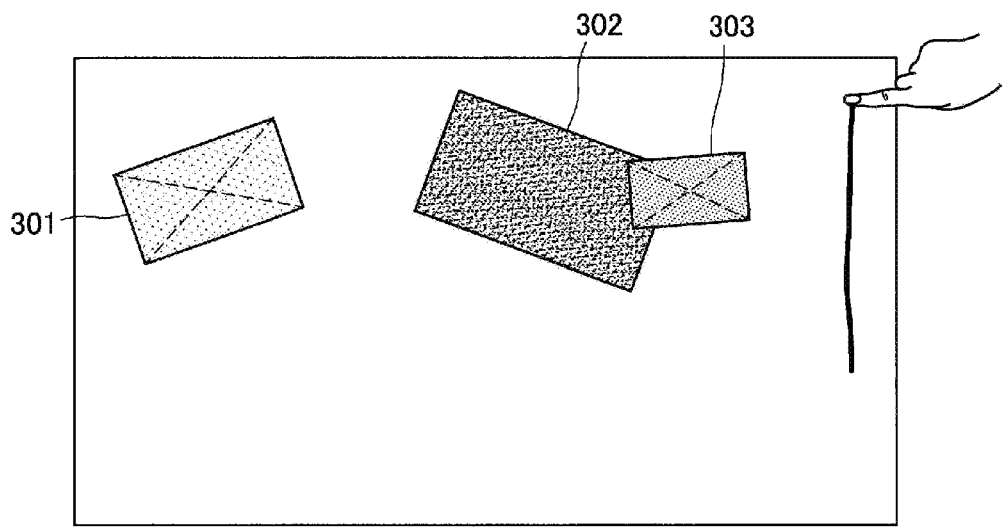
FIG. 8E is an explanatory diagram illustrating a state in which a user has performed a gesture of drawing a single line on a display surface with one of his/her fingers.
Figure 8F:
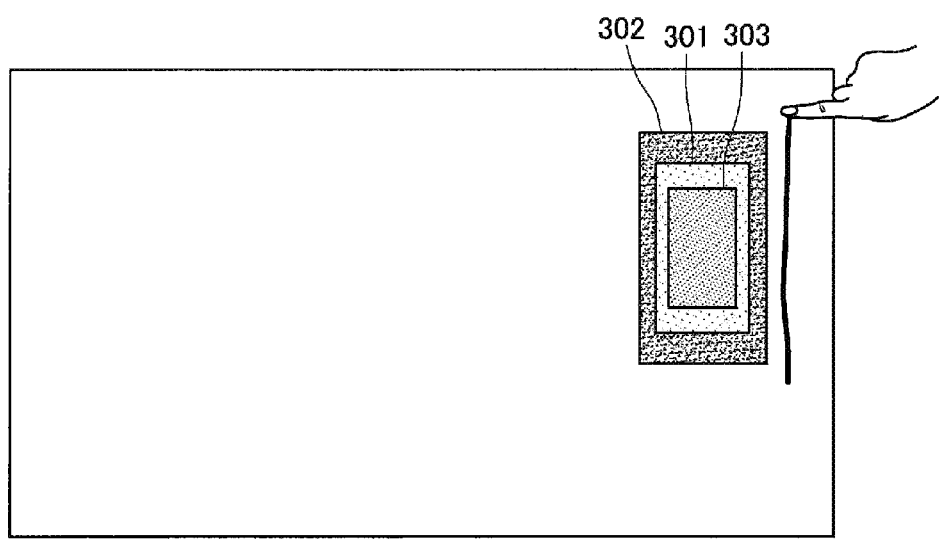
FIG. 8F is an explanatory diagram illustrating a state in which a user has performed a gesture of drawing a single line on a display surface with one of his/her fingers.

Also, the plurality of windows may be aligned in an overlapping manner as long as the windows are present on one vertical line when the windows are aligned in accordance with the user's gesture of drawing one line with one of his/her fingers. FIGS. 8E and 8F are explanatory diagrams illustrating a state in which the user has performed a gesture of drawing one line on a display surface with one of his/her fingers. In this example, a state in which the plurality of windows 301, 302, and 303 is aligned on one vertical line as illustrated in FIG. 8E in an overlapping manner as illustrated in FIG. 8F in response to the gesture is illustrated. At this time, the windows may be aligned in an overlapping manner such that windows with larger areas are located on the lower side as illustrated in FIG. 8F.

Figure 8G:
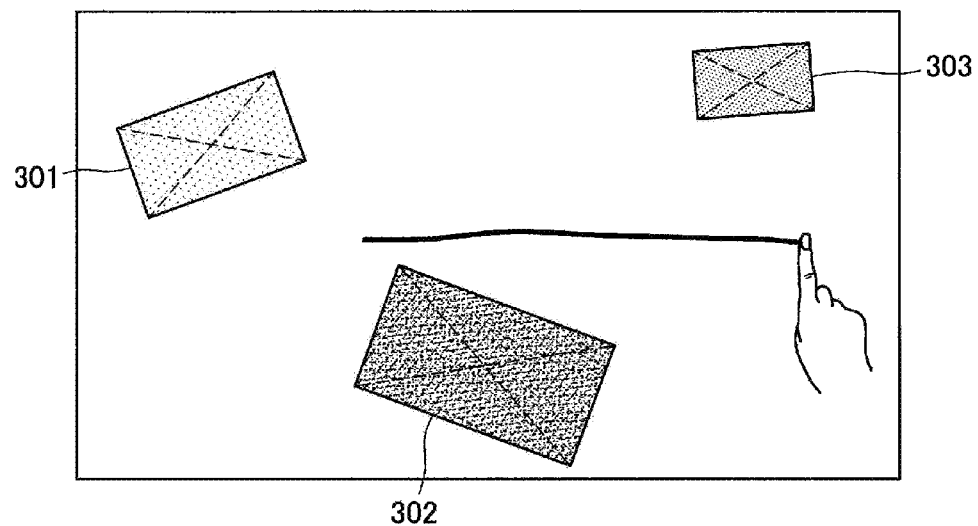
FIG. 8G is an explanatory diagram illustrating a state in which a user has performed a gesture of drawing a single line on a display surface with one of his/her fingers.
Figure 8H:
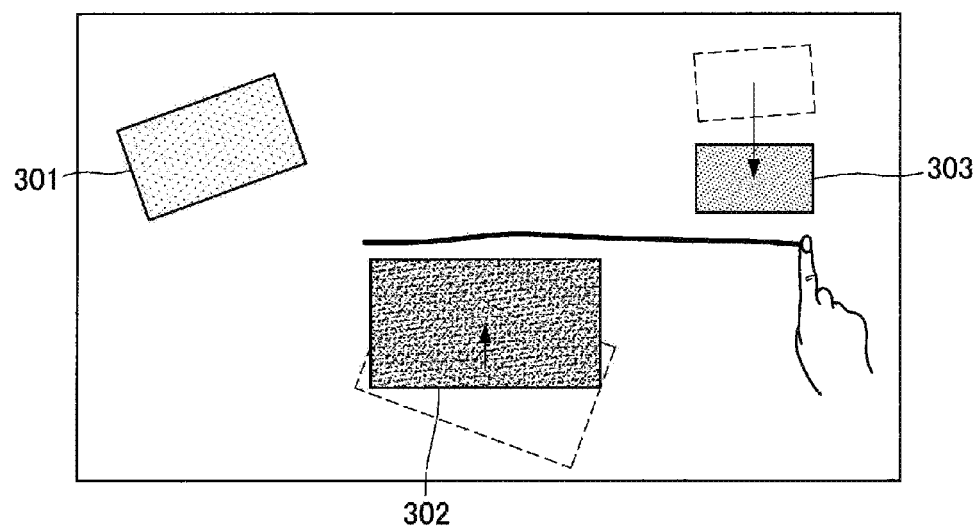
FIG. 8H is an explanatory diagram illustrating a state in which a user has performed a gesture of drawing a single line on a display surface with one of his/her fingers.

The location at which the user draws his/her gesture is not limited to a location near an end of the display surface. FIG. 8G is an explanatory diagram illustrating a state in which the user has performed a gesture of drawing one line with one of his/her fingers near the center of the display surface. In a case in which the user has performed a gesture at such a location, the windows 302 and 303 are the windows as targets of movement, and the windows 302 and 303 may be moved to the lower side and the upper side of the one line, respectively. FIG. 8H is an explanatory diagram illustrating a state in which the windows 302 and 303 are aligned along the one line that the user has drawn.

(2) User Draws One Line with Two of His/Her Fingers

Figure 9A:
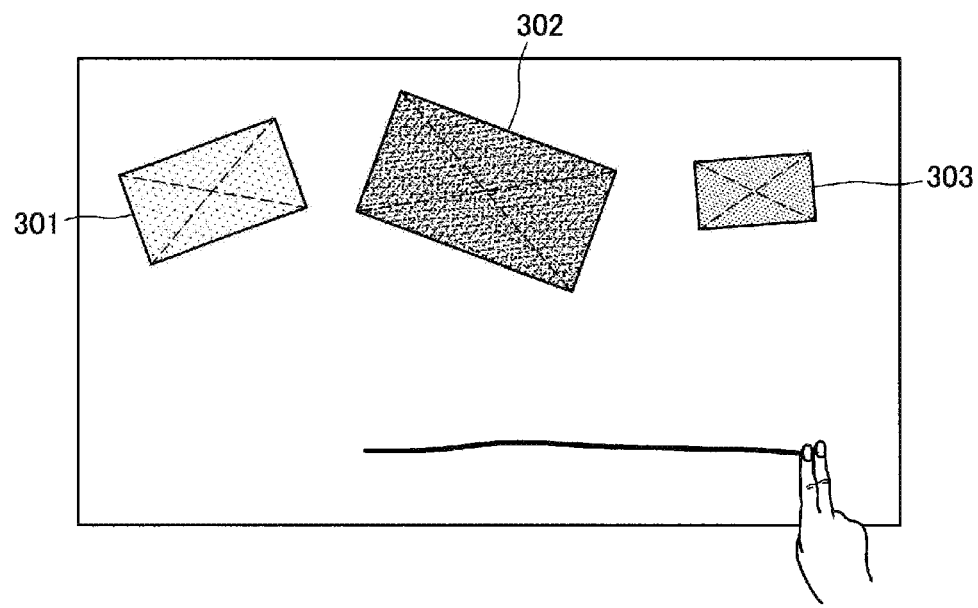
FIG. 9A is an explanatory diagram illustrating a state in which the user has performed a gesture of drawing a single line on the display surface with two of his/her fingers.
Figure 9B:
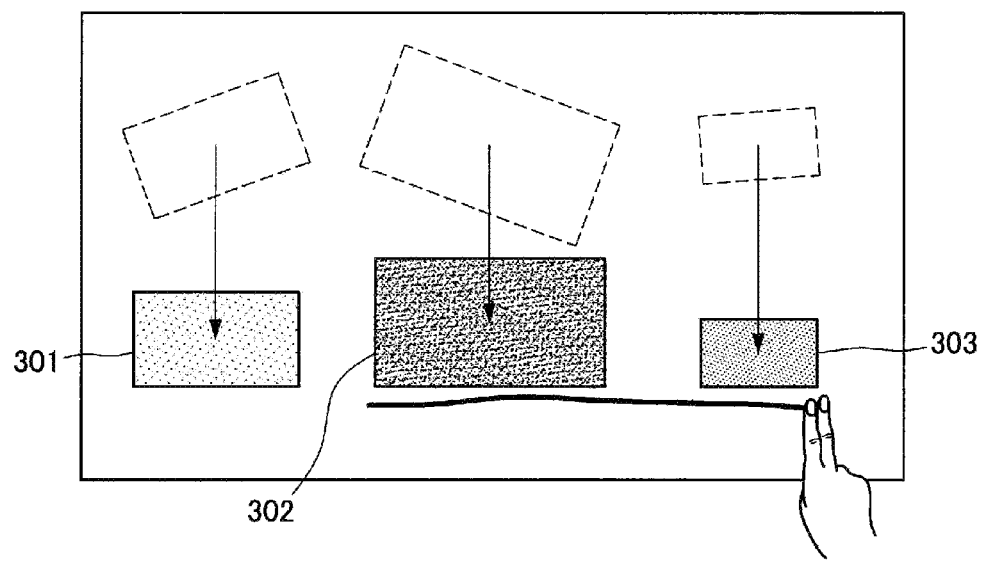
FIG. 9B is an explanatory diagram illustrating a state in which the user has performed a gesture of drawing a single line on the display surface with two of his/her fingers.

In the embodiment, a user's gesture of drawing one line with two of his/her fingers is for aligning all objects that are being displayed on the display screen by the output unit 130 along the line and on an extension of the line). FIGS. 9A and 9B are explanatory diagrams illustrating a state in which the user has performed a gesture of drawing one line on a display surface with two of his/her fingers. If the user performs this gesture, the windows 301 to 303 randomly aligned as illustrated in FIG. 9A are aligned along the line that the user has drawn as illustrated in FIG. 9B. When the windows are aligned, the respective windows are aligned such that sides that are close to the line are located on the lower side. The windows 301 to 303 are rotated as needed. If the user performs this gesture, the operation target detection unit 230 detects all the windows displayed on the display surface as targets of the effect.

Note that in a case in which target windows are displayed in an overlapping manner, the windows may be aligned such that the windows do not overlap each other when the alignment in accordance with the user's gesture of drawing one line with two of his/her fingers is performed similarly to the gesture performed with one of his/her fingers.

(3) User Draws an "L"-Shaped Line with One of His/Her Fingers

Figure 10A:
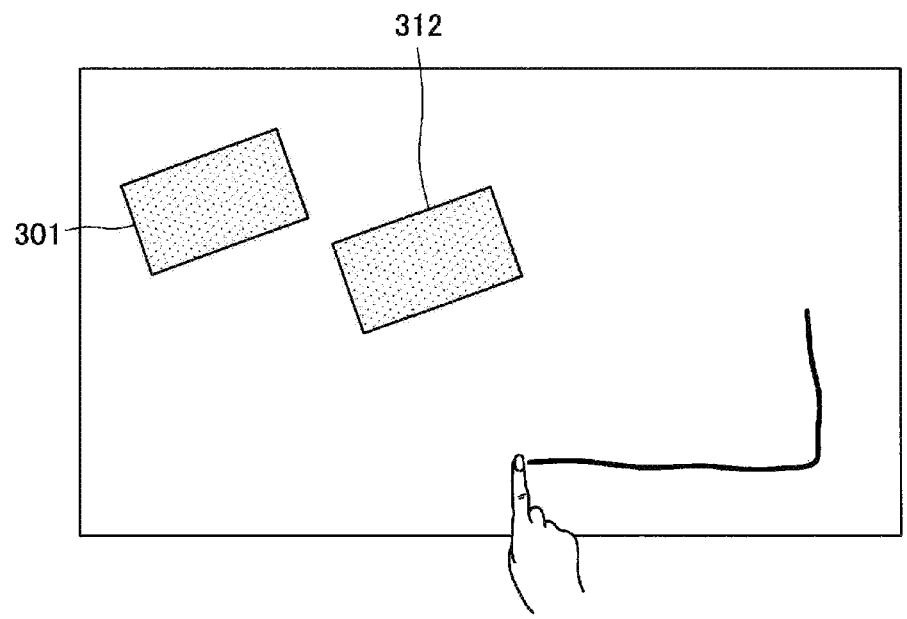
FIG. 10A is an explanatory diagram illustrating a state in which the user has performed a gesture of drawing an "L"-shaped line on the display surface with one of his/her fingers.
Figure 10B:
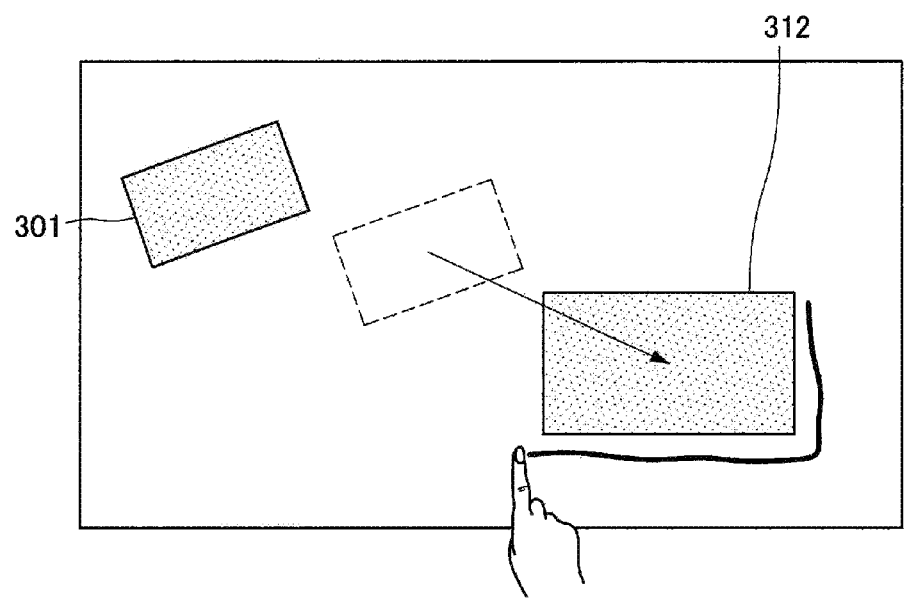
FIG. 10B is an explanatory diagram illustrating a state in which the user has performed a gesture of drawing an "L"-shaped line on the display surface with one of his/her fingers.

In the embodiment, a user's gesture of drawing an "L"-shaped line with one of his/her fingers is for causing an object at the closest location to the line among the objects displayed on the display surface by the output unit 130 to move to a position along the line. That is, a user's operation of drawing a line corresponding to a first part in a certain direction on the display screen with one of his/her fingers and then drawing a line corresponding to a second part in substantially a direction perpendicular to the line while keeping the finger in contact with the display surface is regarded as a gesture of drawing the "L"-shaped line. FIGS. 10A and 10B are explanatory diagrams illustrating a state in which the user has performed the gesture of drawing an "L"-shaped line on the display surface with one of his/her fingers. If the user performs this gesture, the window 312 that is located at the closest position to the line in the windows 311 and 312 that are being displayed as illustrated in FIG. 10A moves as illustrated in FIG. 10B. At this time, the window 312 moves such that the side that is close to the line corresponding to the second part that the user has drawn is located on the lower side. If the gesture of drawing the "L"-shaped line is performed, the window moves such that the direction in which the second part is drawn is located on the upper side in content display in a case in which the display content in the window is content with a vertical orientation, such as a photograph or a video. That is, the vertical orientation with reference to the user himself/herself is set if the user draws the L shape in a normal orientation for the user himself/herself, and the vertical orientation with reference to a counterpart on the opposite side of a desk is set if the user draws the L shape in a normal orientation for the counterpart. As an effect of the gesture of drawing the "L"-shaped line, it is possible to easily arrange an object with reference to the counterpart on the Opposite side of the display screen depending on how to draw the "L" shape as described above. The window 312 is rotated, enlarged, or contracted as needed. If the user performs this gesture, the operation target detection unit 230 detects the window located at the closest position to the line as a target of the effect.

Figure 11A:
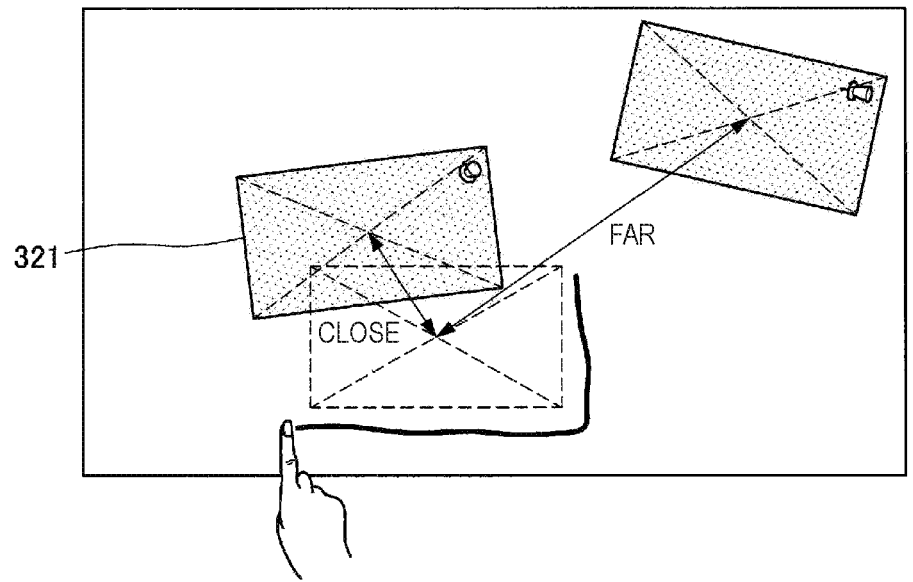
FIG. 11A is an explanatory diagram illustrating a state in which the user has performed a gesture of drawing an "L"-shaped line on the display surface with one of his/her fingers.
Figure 11B:
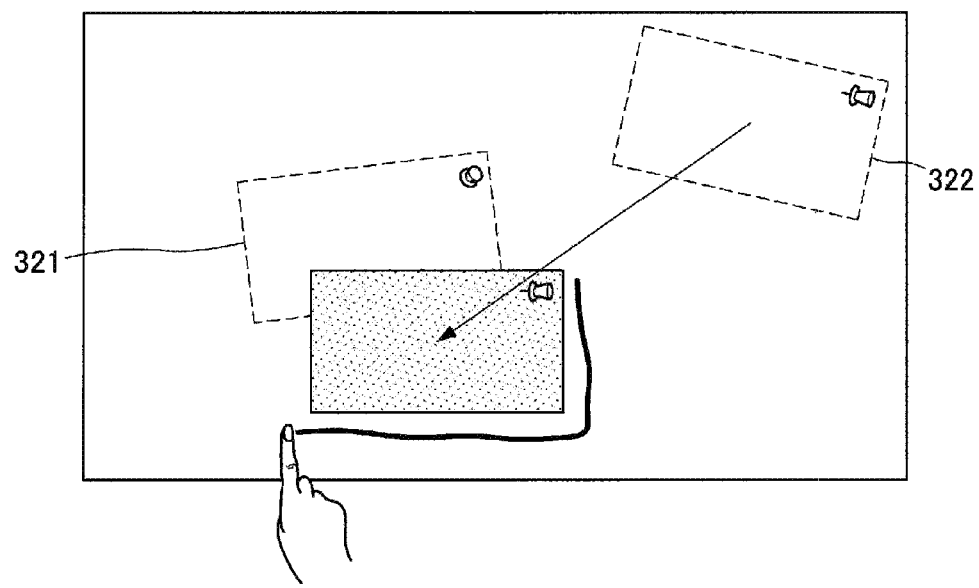
FIG. 11B is an explanatory diagram illustrating a state in which the user has performed a gesture of drawing an "L"-shaped line on the display surface with one of his/her fingers.

If the user performs the gesture of drawing the "L"-shaped line with one of his/her fingers and the display position of the object that is located at the closest position to the line is fixed, an object that is the second closest to the line instead of the object is moved to a position along the line. FIGS. 11A and 11B are explanatory diagrams illustrating a state in which the user has performed the gesture of drawing the "L"-shaped line on the display surface with one of his/her fingers. In this case, although the window located at the closest position to the line is the window 321, the display position of the window 321 is fixed. Therefore, the operation target detection unit 230 detects the window 322 that is the window located at the second closest position to the line rather than the window 321 as a target of the effect.

In this manner, the information processing system 100 according to the embodiment of the disclosure can realize display processing in accordance with the user's gesture by setting a condition for an operation target or setting a condition for ignoring the condition for each gesture.

The target allocation unit 240 performs allocation processing of a gesture that the gesture detection unit 220 detects and a target object that the operation target detection unit 230 detects. That is, the target allocation unit 240 determines which gesture affects which object as an operation target.

First, the target allocation unit 240 determines whether or not it is possible to uniquely decide a gesture from the line that the user has drawn on the display screen. In a case in which it is obscure that the line that the user has drawn on the display screen is one line or an L-shaped line, that is, in a case in which a plurality of candidates for the gesture corresponding to the line that the user has drawn is present, for example, the target allocation unit 240 performs obscure gesture solution processing for solving the obscurity.

Figure 12A:
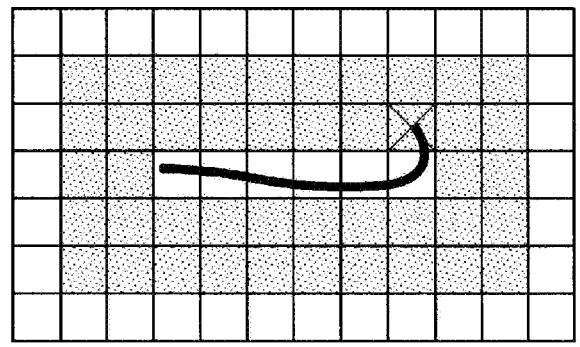
FIG. 12A is an explanatory diagram illustrating an example in which a gesture is detected using pattern matching.
Figure 12B:
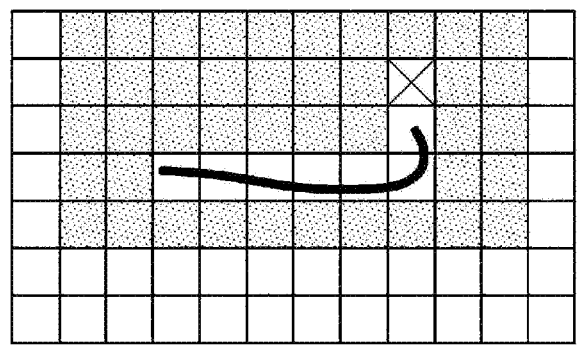
FIG. 12B is an explanatory diagram illustrating an example in which a gesture is detected using pattern matching.

FIGS. 12A and 12B are explanatory diagrams illustrating an example in which a gesture is detected using pattern matching. In a case in which a recognition pattern mask includes a total of fifty cells, namely five cells in the longitudinal direction and ten cells in the transverse direction (note that a cell is assumed to be a group of a predetermined number of pixels), the gesture conforms both to a recognition pattern matching for one line and to a recognition pattern mask for an L-shaped line at a proportion of 98% (forty nine cells in fifty cells). Therefore, the target allocation unit 240 cannot determine which of one line and an L-shaped line the user has drawn in this case. Although such a case in which the proportions of coincidence with two recognition pattern masks are completely the same is a rare case, of course, an allowance may typically be given to a gesture definition, there is also a case in which a difference between the proportions of coincidence is only a certain percentage, and even in such a case, the target allocation unit 240 cannot uniquely decide a gesture.

Figure 13:
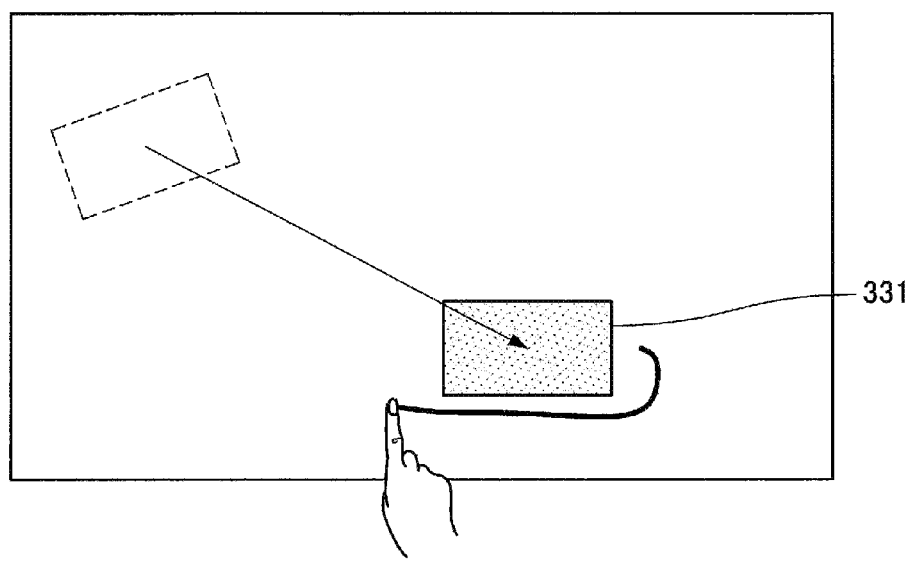
FIG. 13 is an explanatory diagram illustrating gesture allocation processing performed by a target allocation unit 240.

In a case in which it is not possible to uniquely decide a gesture on the basis of the degrees of coincidence with the recognition pattern masks, the target allocation unit 240 can also perform processing of not allowing all the gestures to be established. Meanwhile, in a case in which it is not possible to uniquely decide a gesture, the target allocation unit 240 may select only common effects among the definitions accumulated in the gesture definition accumulation unit 210 and give the effects to the target object. Referring to FIG. 6, for example, the common effects of the gesture of drawing one line and the gesture of drawing an L-shaped line are "position" and "rotation". Therefore, the target allocation unit 240 may give only the effect "position" and "rotation" to the target object. FIG. 13 is an explanatory diagram illustrating gesture allocation processing performed by the target allocation unit 240. In a case in which it is not possible to uniquely decide a gesture, the target allocation unit 240 may give only the effects "position" and "rotation" to the target window 331 among the effects of the gesture of drawing the L-shaped line.

Figure 14:
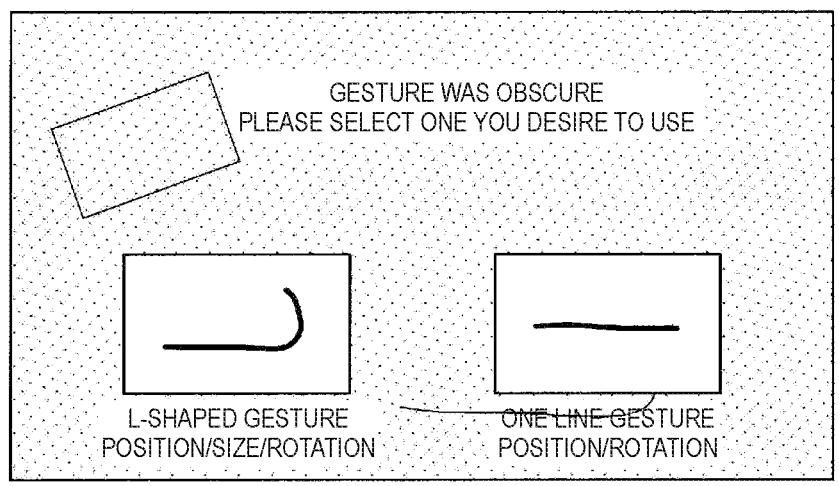
FIG. 14 is an explanatory diagram illustrating an example of a user interface that an output unit 130 outputs.

In a case in which it is not possible to uniquely decide a gesture, the target allocation unit 240 may allow the user to select an effect that the user desires to use. FIG. 14 is an explanatory diagram illustrating an example of a user interface that an output unit 130 outputs in the case in which it is not possible to uniquely decide a gesture. If the user selects a gesture that the user desires to use, the graphics display processing unit 120 executes processing in accordance with the gesture.

The information processing system 100 according to the embodiment may be simultaneously operated by a plurality of users. The target allocation unit 240 determines which of gestures performed by the plurality of users priority is to be placed on.

Figure 15A:
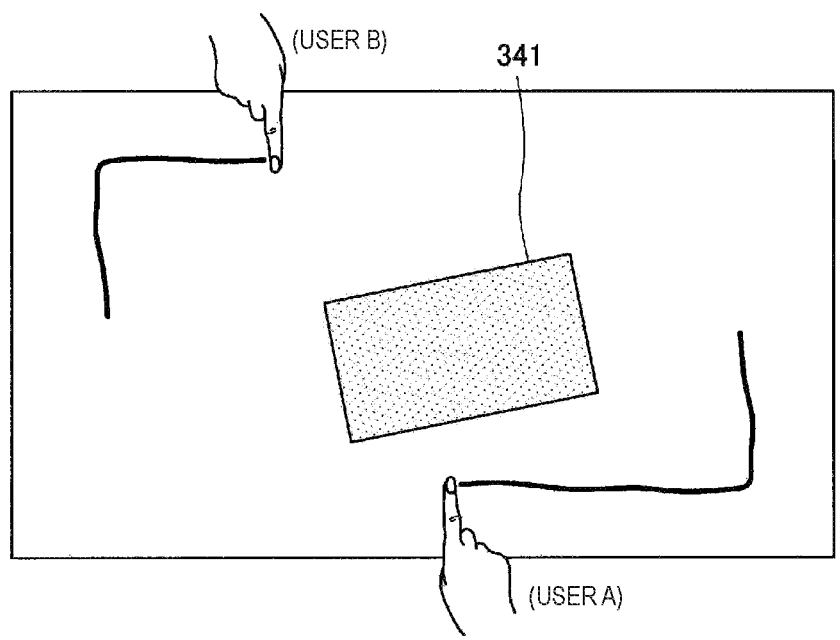
FIG. 15A is an explanatory diagram illustrating an exemplary case in which both of two users A and B draw an L-shaped line on the display surface at similar timings.
Figure 15B:
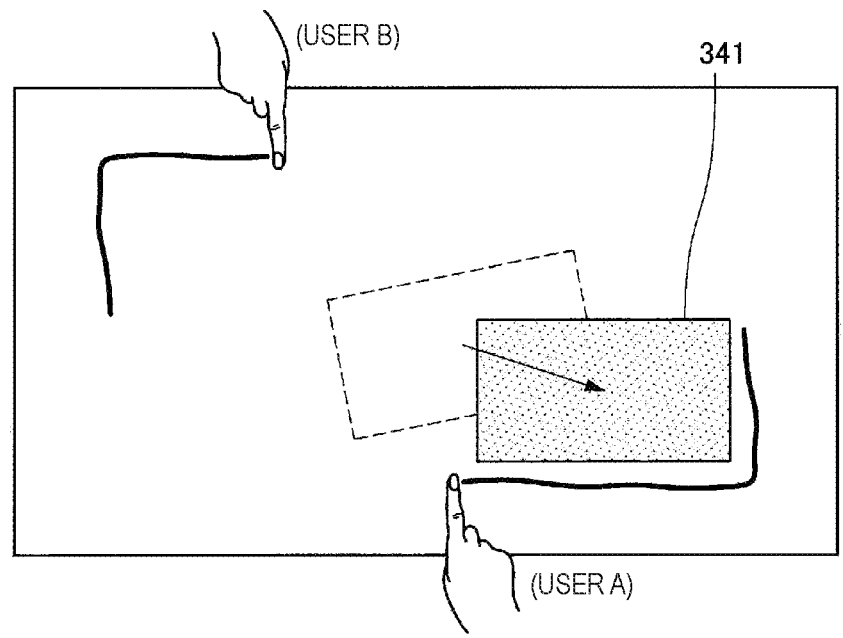
FIG. 15B is an explanatory diagram illustrating an exemplary case in which both of two users A and B draw an L-shaped line on the display surface at similar timings.

FIG. 15A is an explanatory diagram illustrating an exemplary case in which both two users A and B draw L-shaped lines on the display surface at similar timings. In the case in which two users draw the L-shaped line on the display screen at similar timings in this manner, the target allocation unit 240 may place priority on the user who has finished to draw the line earlier, for example. FIG. 15B is an explanatory diagram in which priority is placed on a gesture performed by the user A who has finished to draw the line earlier. The target allocation unit 240 places priority on the gesture performed by the user A who has finished to draw the line earlier. Therefore, the effect of the gesture performed by the user A is applied to the window 341.

Figure 15C:
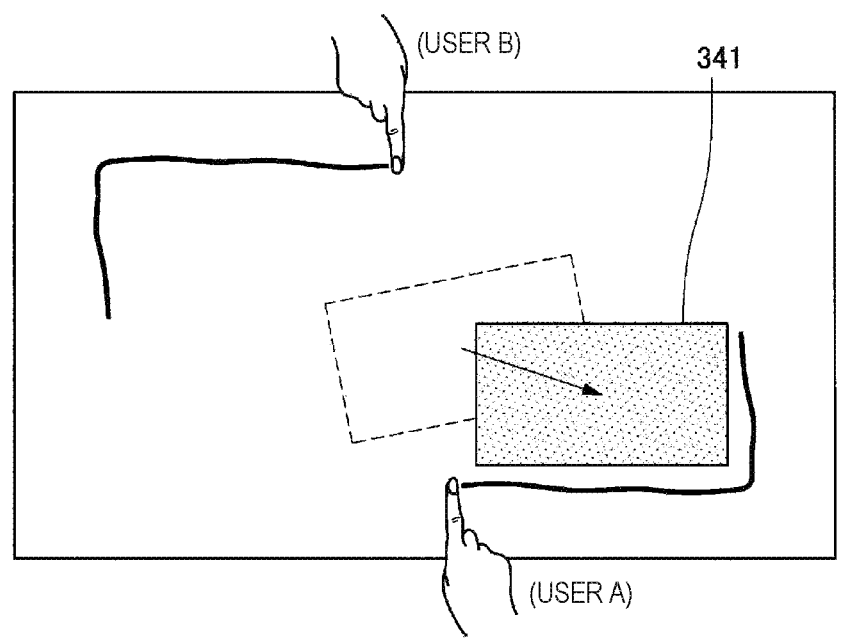
FIG. 15C is an explanatory diagram illustrating an exemplary case in which both of two users A and B draw an L-shaped line on the display surface at similar timings.

In a case in which the two users draw the L-shaped lines on the display screen at similar timings, there is no significant difference in the time at which the users have finished to draw the lines, and it is difficult to determine who has finished to draw the line earlier, the target allocation unit 240 may place priority on the user who has drawn the line located at a closer position to a gravity center. FIG. 15C is an explanatory diagram illustrating an example in which priority is placed on a gesture performed by the user A who has drawn the line located at a closer position to the gravity center of the window 341. The target allocation unit 240 places priority on the gesture performed by the user A who has drawn the line located at the closer position to the gravity center of the window 341. Therefore, the effect of the gesture performed by the user A is applied to the window 341.

Figure 16A:
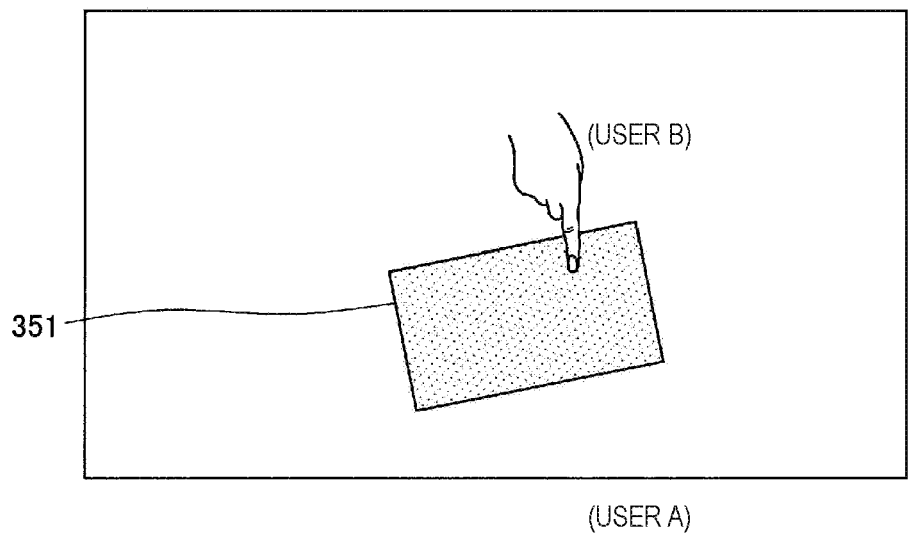
FIG. 16A is an explanatory diagram illustrating a state in which the user B is touching the window.
Figure 16B:
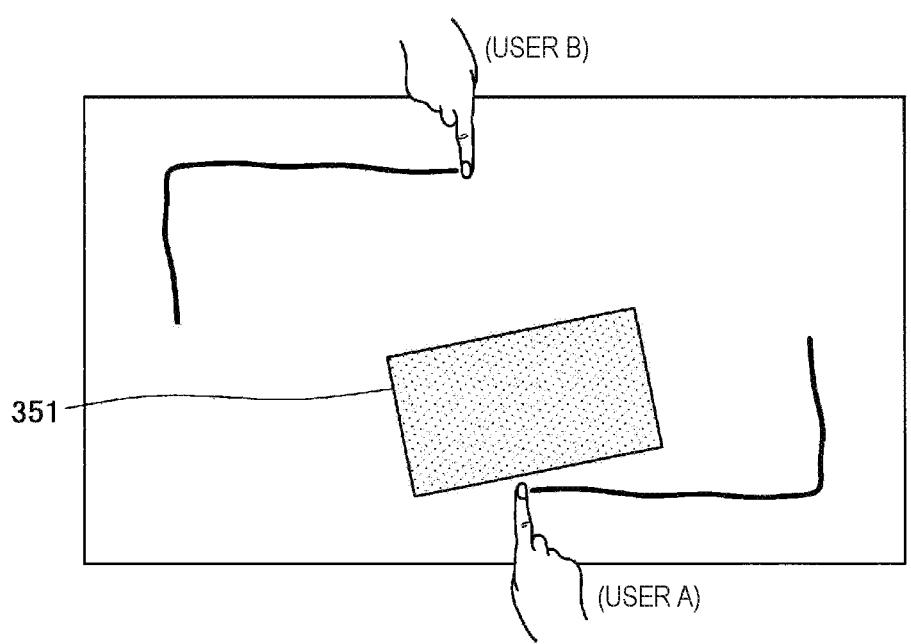
FIG. 16B is an explanatory diagram illustrating an exemplary case in which both of two users A and B draw an L-shaped line on the display surface at similar timings.
Figure 16C:
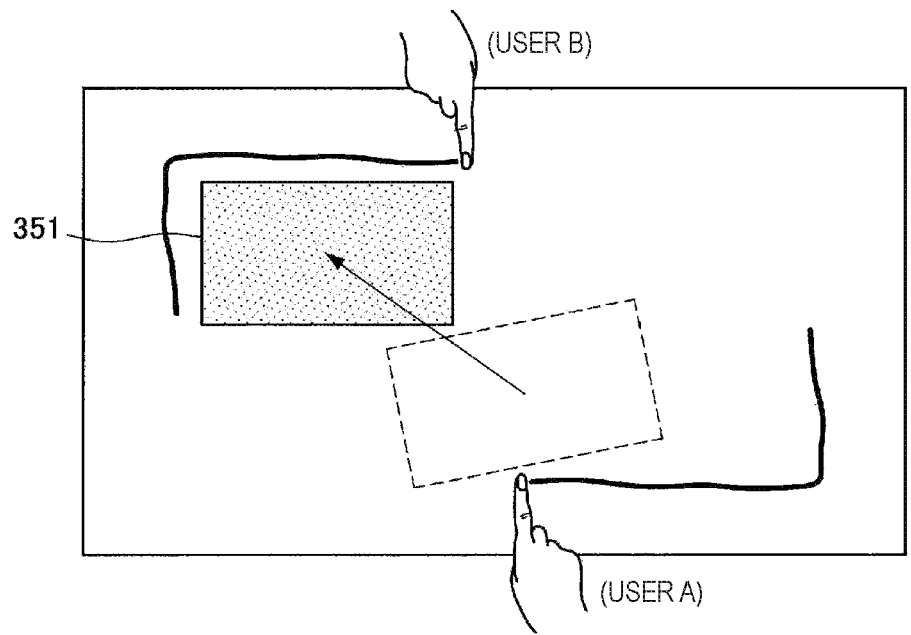
FIG. 16C is an explanatory diagram illustrating an example in which priority is placed on a gesture of the user B touching the window before the gesture.

In a case in which the two users have performed the gestures at similar timings, the target allocation unit 240 may use who had used (operated) the target object before performing the gestures as a reference for the determination. If it is detected that the user B had touched the window 351 as illustrated in FIG. 16A, for example, the target allocation unit 240 may place priority on the gesture of the user B who had touched the window 351 before performing the gesture rather than the gesture of the user A who has drawn the line located at the closer position to the gravity center of the window 351 even if the users A and B have performed the gestures of drawing the L-shaped lines at the similar timings as illustrated in FIG. 16B and have finished to draw the L-shaped lines at the same time. FIG. 16C is an explanatory diagram illustrating an example in which priority is placed on the gesture of the user B who had touched the window 351 before the gesture.

Note that information regarding which user has finally touched the window may not constantly be held in the information processing system 100. For example, the target allocation unit 240 may regard an object that no one has touched for ten seconds or longer after someone finally touched it as an object that no one has touched and may place priority on a gesture that is located at a closer position to the object.

In another case in which objects overlap one another, for example, the target allocation unit 240 may place priority on an object in the upper layer or may place priority on an object directed to the user who has performed the gesture.

Figure 17A:
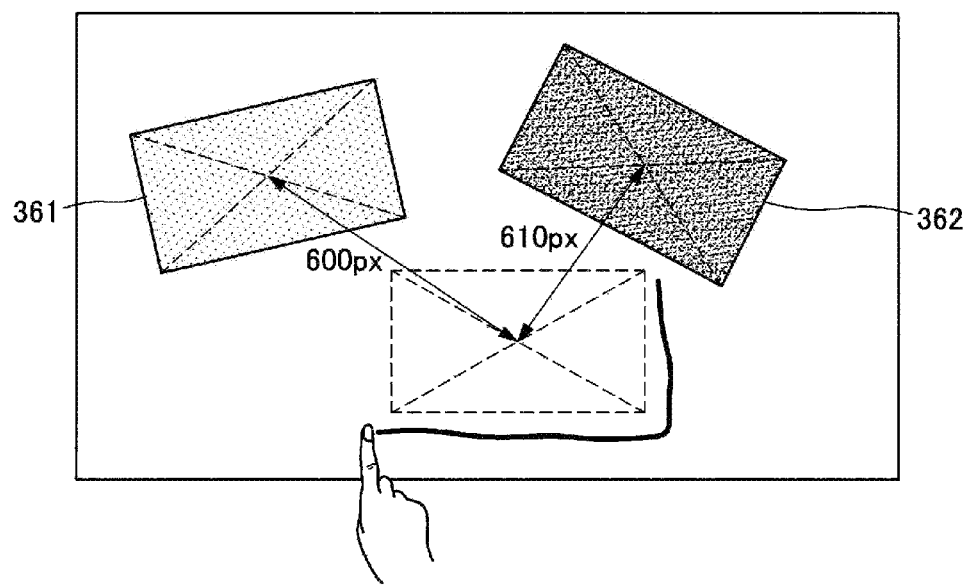
FIG. 17A is an explanatory diagram illustrating a state in which the user has performed a gesture of drawing an L-shaped line on the display surface.

In the embodiment, the object to which the gesture of drawing the L-shaped line is applied is the object located at the closest position to the line. However, there is a case in which it is not possible to determine which of objects the effect is to be applied depending on the location where the user has drawn the L-shaped line. FIG. 17A is an explanatory diagram illustrating a state in which the user has performed the gesture of drawing the L-shaped line on the display screen in which two windows 361 and 362 are displayed on the display screen. In this case, it is assumed that the amount of movement of the gravity center of the window 361 is 600 pixels and that the amount of movement of the gravity center of the window 362 is 610 pixels in a case in which the gesture of drawing the L-shaped line is applied. Although the window 361 with a smaller amount of movement is the target of application of the effect in a strict sense, there may be a probability that the user has performed the gesture while considering the window 362 as a target of the application of the effect.

Figure 17B:
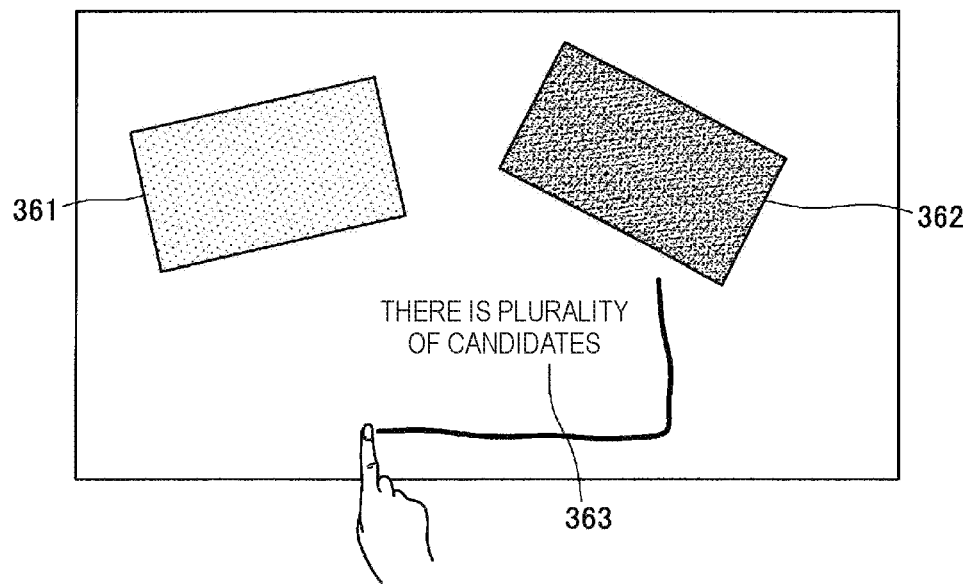
FIG. 17B is an explanatory diagram illustrating a state in which a message is being displayed on the display surface or a trajectory is vibrating on the display surface.

In such a case in which there is no significant difference between the amounts of movement of the object and it is not possible to recognize that which of the objects the user has considered as a target of the operation of performing the gesture, that is, a plurality of candidates for the operation target object is present, the target allocation unit 240 performs obscure operation target solution processing of solving the obscurity of the object. For example, the target allocation unit 240 may decide an object located at the closest position as an operation target, or in another case, the target allocation unit 240 may provide a notification that it is not possible to uniquely decide the operation target object to the user by causing a message indicating that a plurality of operation targets is present to be displayed or vibrating the trajectory that the user has drawn on the display surface. FIG. 17B is an explanatory diagram illustrating a state in which a message is being displayed on the display surface or a trajectory is vibrating on the display surface. For example, the target allocation unit 240 may encourage the user to perform the gesture again by causing a message 363 indicating that a plurality of operation targets is present to be displayed. Alternatively, the target allocation unit 240 may encourage the user to perform the gesture again by providing a notification that a plurality of operation targets is present to the user through vibration of the trajectory.

Figure 18A:
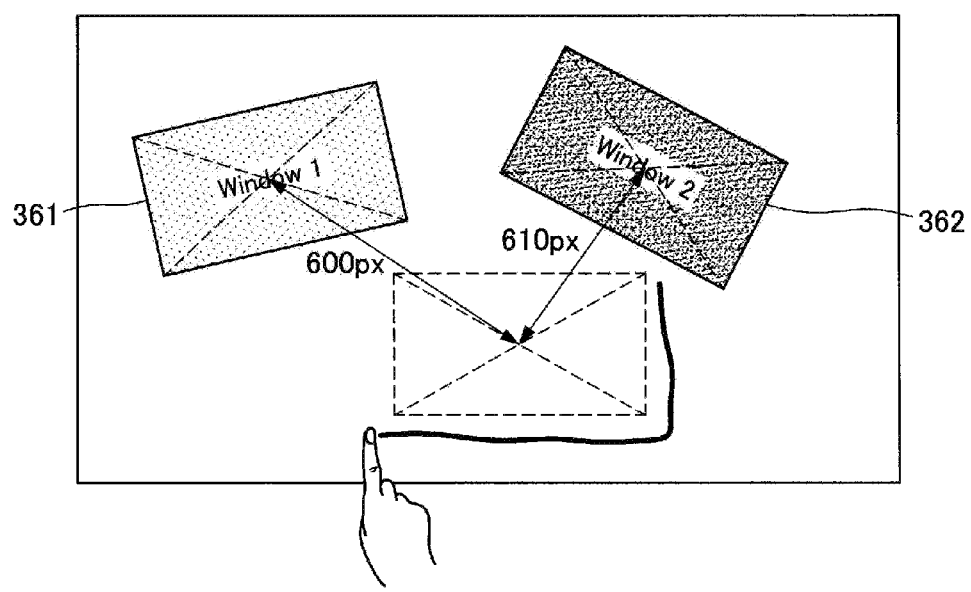
FIG. 18A is an explanatory diagram illustrating a state in which the user has performed a gesture of drawing an L-shaped line on the display surface.
Figure 18B:
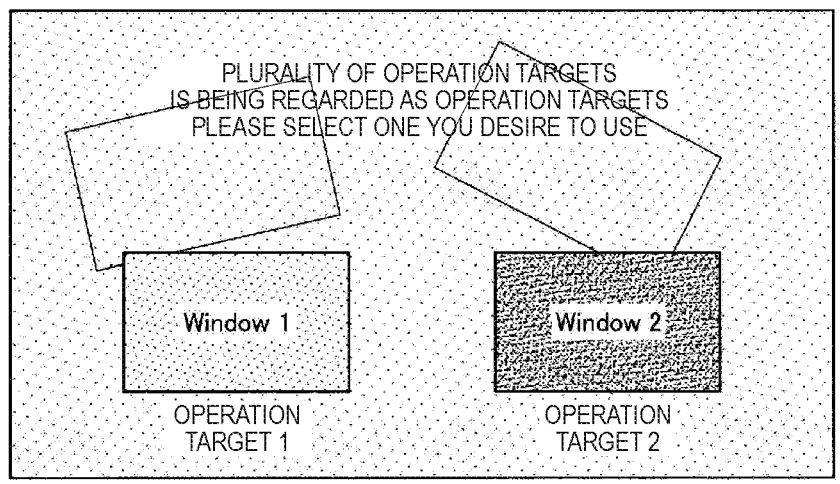
FIG. 18B is an explanatory diagram illustrating an example in which a message is being displayed on the display surface.

In such a case in which there is no significant difference between the amounts of movement of the object and it is not possible to recognize that which of the objects the user has considered as a target of the operation of performing the gesture, the target allocation unit 240 may allow the user to select the target window. FIG. 18A is an explanatory diagram illustrating a state in which the user has performed the gesture of drawing the L-shaped line on the display screen in which two windows 361 and 362 are displayed on the display screen similarly to FIG. 17A. In this case, it is also assumed that there is no significant difference between the amounts of movement of the object and that it is not possible to recognize which of the objects the user has considered as a target of operation of performing the gesture similarly to FIG. 17A. In this case, the target allocation unit 240 may cause a message to allow the user to select the target window to which the effect of the gesture is to be applied to be displayed on the display screen. FIG. 18B is an explanatory diagram illustrating an example in which a message for allowing the user to select the target window to which the effect of the gesture is to be applied is being displayed on the display surface. The target allocation unit 240 can allow the user to select the target window by causing such a message to be displayed.

The target allocation unit 240 can flexibly decide the operation target even in a case in which an original operation target is operated by another user when the user performs the gesture. For example, the target of the application of the effect of the gesture of drawing the L-shaped line is an object located at the closest position to the trajectory. However, if the object is caused to move when the object is being operated by another user, usability of the user who is operating the object is degraded. Thus, the target allocation unit 240 may exclude the object that a user who is different from the user who has performed the gesture is operating from the target of the application of the effect.

Figure 19A:
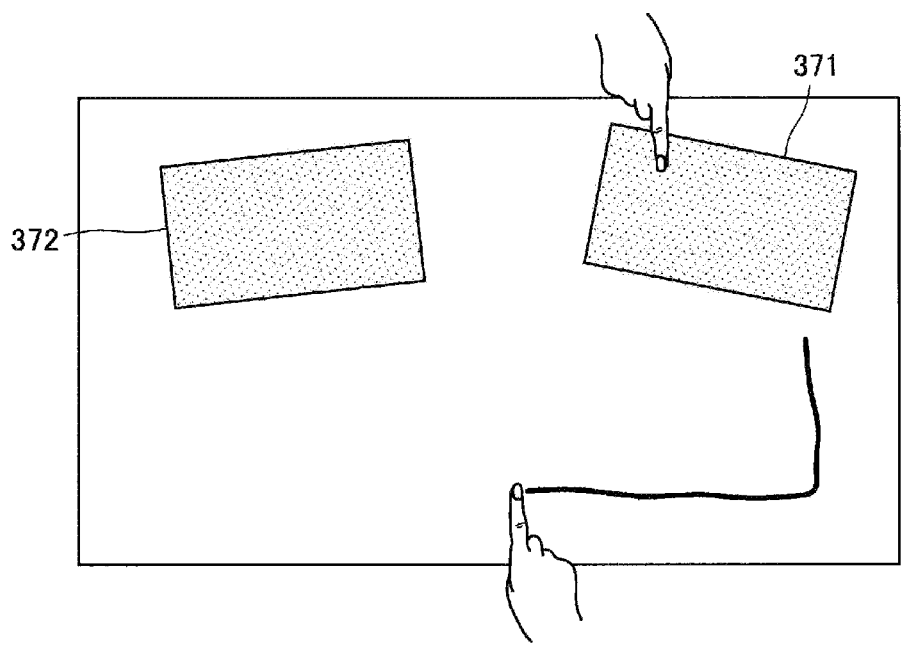
FIG. 19A is an explanatory diagram illustrating a state in which the user A has performed a gesture of drawing an L-shaped line when the user B is operating the window.
Figure 19B:
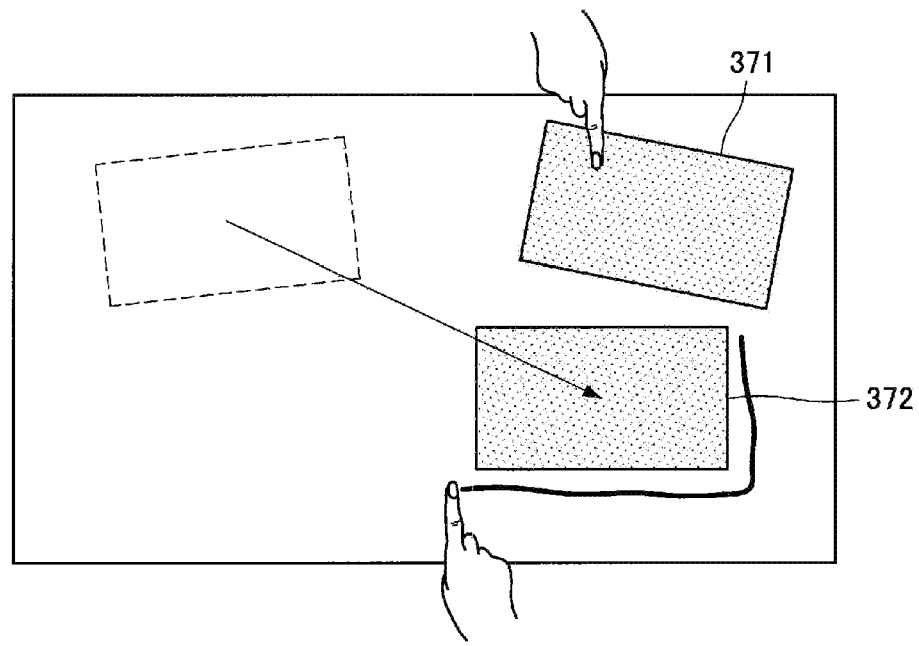
FIG. 19B is an explanatory diagram illustrating a state in which the window moves.

FIG. 19A is an explanatory diagram illustrating a state in which the user A has performed a gesture of drawing an "L"-shaped line when the user B is operating the window 371. In accordance with the rule for the gesture in the embodiment, the window 371 moves by the user A drawing the L-shaped line. However, the user B is operating the window 371, and the user B may be annoyed if the window 371 is moved. Thus, the target allocation unit 240 excludes the window 371 that the user B is operating from the target of the application of the effect. FIG. 19B is an explanatory diagram illustrating a state in which the window 371 is excluded from the target of the application of the effect and the window 372 located at the second closest position to the trajectory of the gesture moves.

Figure 19C:
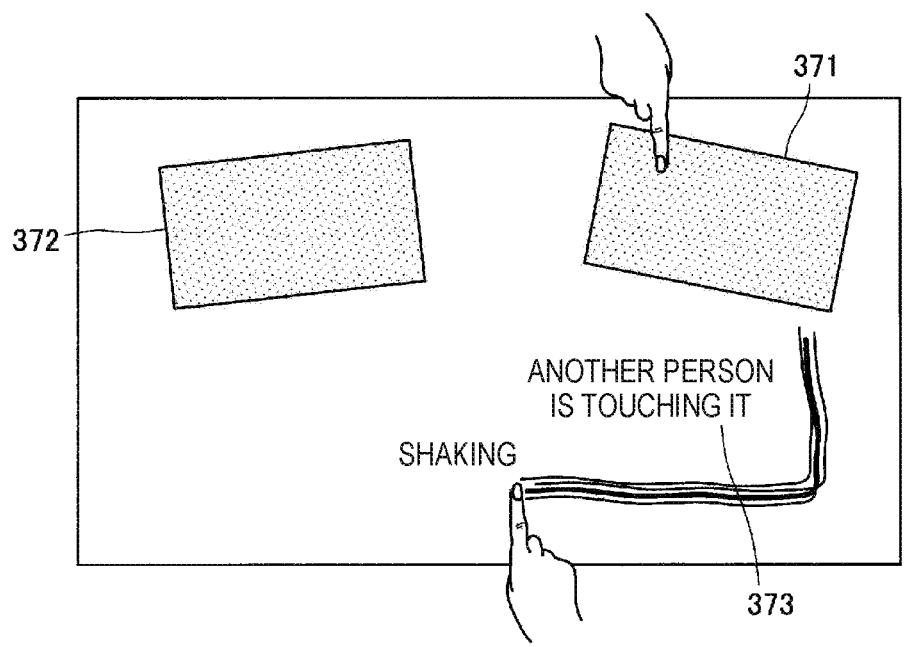
FIG. 19C is an explanatory diagram illustrating a state in which a message is being displayed on the display surface or a trajectory is vibrating on the display surface.

In a case in which a similar phenomenon occurs, the target allocation unit 240 may provide a notification that it is not possible to move the operation target object to the user by causing a message indicating that the operation target window is being displayed by another user to be displayed or vibrating the trajectory that the user has drawn on the display screen rather than moving the window 372. FIG. 19C is an explanatory diagram illustrating a state in which a message is being displayed on the display surface or a trajectory is vibrating on the display surface. For example, the target allocation unit 240 may encourage the user to perform the gesture again by causing a message 373 indicating that the operation target window is being operated by another user to be displayed. Alternatively, the target allocation unit 240 may encourage the user to perform the gesture again by providing a notification that the operation target window is being operated by another user to the user through vibration of the trajectory.

The effect invoking unit 250 performs processing of applying the effect to the object on the display surface on the basis of the gesture that the gesture detection unit 220 detects and the operation target that the operation target detection unit 230 detects. For example, the effect invoking unit 250 provides notification of information related to content of the gesture and the operation target to the graphics display processing unit 120 and causes the graphics display processing unit 120 to perform actual image processing. The graphics display processing unit 120 executes processing such as movement, enlargement or contraction, or rotation of the window on the basis of the information from the effect invoking unit 250.

Figure 20A:
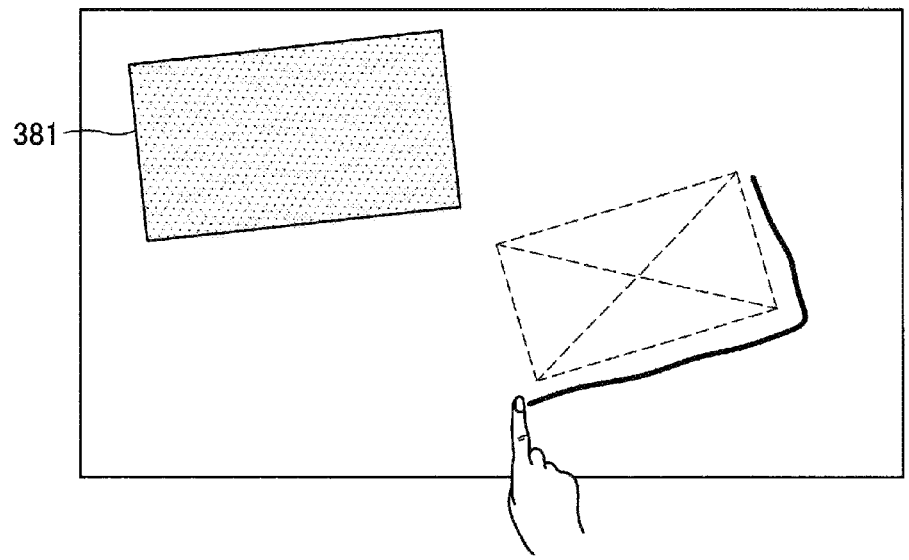
FIG. 20A is an explanatory diagram illustrating a state in which the user has drawn an L-shaped line on the display surface.
Figure 20B:
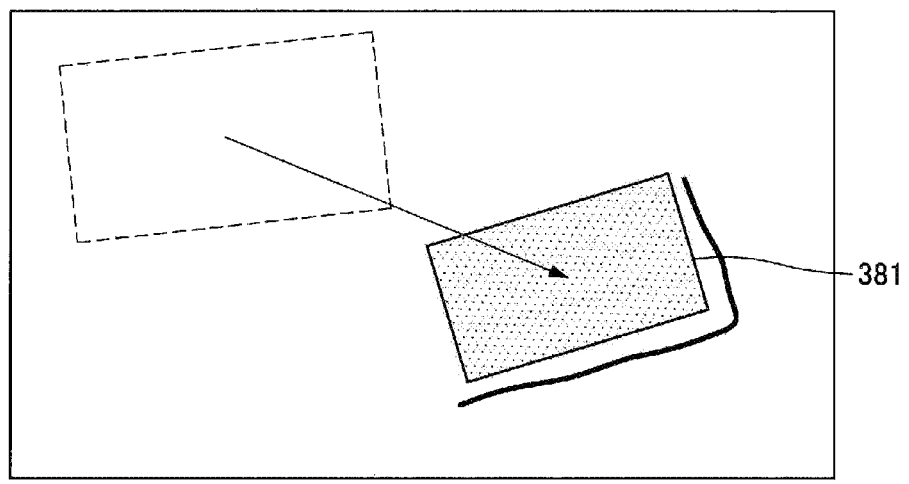
FIG. 20B is an explanatory diagram illustrating a state in which an effect of a gesture of drawing an L-shaped line has been provided to the window.

FIG. 20A is an explanatory diagram illustrating a state in which the user has drawn an L-shaped line on the display surface. In this case, the gesture detection unit 220 detects that the gesture of drawing the L-shaped line has been performed, and the operation target detection unit 230 detects that the window 381 is an operation target of the gesture. The effect invoking unit 250 provides a notification to the graphics display processing unit 120 such that the effect of the gesture of drawing the L-shaped line is applied to the window 381. The graphics display processing unit 120 that has received the notification executes graphics processing (here, movement, rotation, and contraction) on the window 381. FIG. 20B is an explanatory diagram illustrating a state in which an effect of a gesture of drawing an L-shaped line has been provided to the window 381.

The effect invoking unit 250 corrects parameters related to the graphics processing that is used when the effect is applied as needed in order to understand what an intention of the user's input is before providing notification of information related to the content of the gesture and the operation target to the graphics display processing unit 120.

Figure 21A:
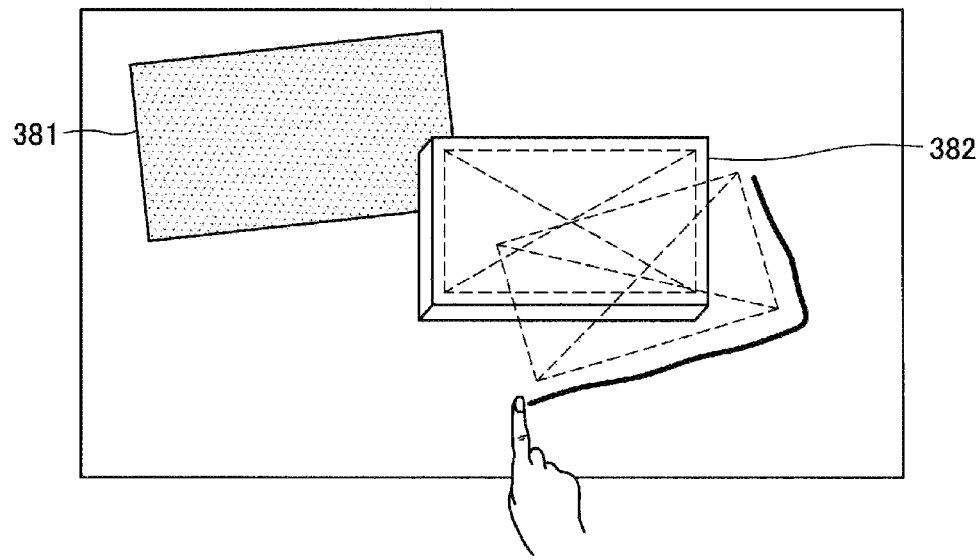
FIG. 21A is an explanatory diagram illustrating a state in which the user has drawn an L-shaped line on the display surface.

For example, a case in which a physical body is placed on the display surface and the user has performed the gesture of drawing the L-shaped line along the body will be considered. FIG. 21A is an explanatory diagram illustrating a state in which the user has drawn the L-shaped line on the display surface. In this case, the gesture detection unit 220 detects that the gesture of drawing the L-shaped line has been performed, and the operation target detection unit 230 detects that the window 381 is an operation target of the gesture. However, a rectangular parallelepiped body 382 is placed on the display surface, and visibility of the window 381 is degraded if the window 381 is caused to move as it is. Note that information regarding whether or not there is a body on the display surface and the position and the height of the body is acquired by the input unit 110.

Figure 21B:
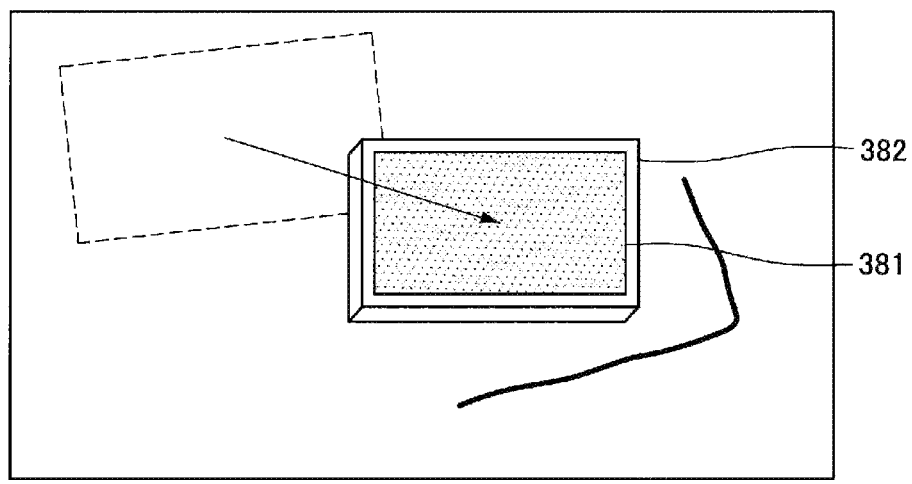
FIG. 21B is an explanatory diagram illustrating a state in which an effect of a gesture of drawing an L-shaped line has been provided to the window.

Thus, the effect invoking unit 250 decides to cause the window 381 to move such that the window 381 overlaps the surface of the body 382 if the window 381 after movement, rotation, and deformation overlaps the surface of the body 382 at a proportion of a predetermined value or greater. FIG. 21B is an explanatory diagram illustrating a state in which the effect of the gesture of drawing the L-shaped line has been provided to the window 381 such that the effect overlaps the surface of the object 382. The effect invoking unit 250 can maintain visibility of the window 381 by causing the window 381 to move in this manner. Such an application of the effect in consideration of the position of the body can also be used when an object is projected only on a white napkin in a case in which the information processing system 100 projects an image on a black table.

Figure 22A:
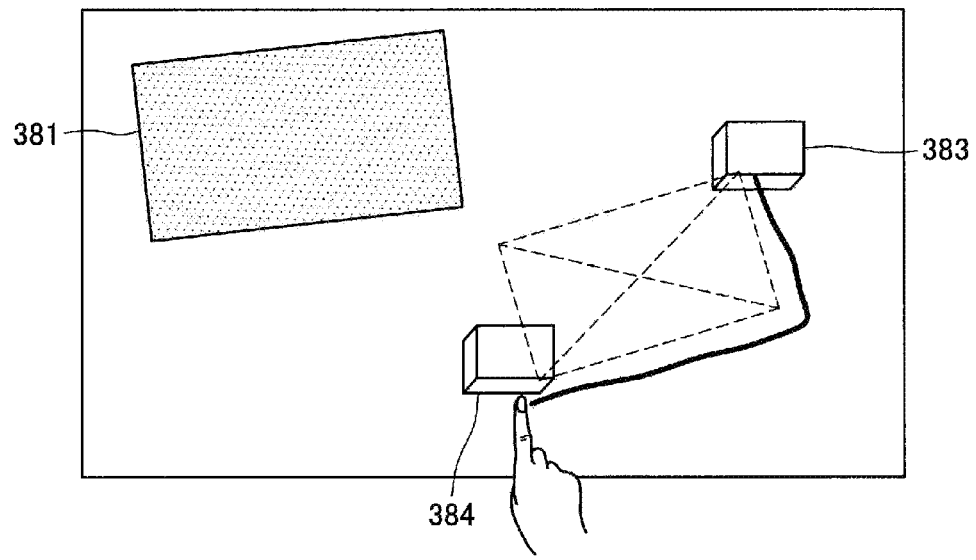
FIG. 22A is an explanatory diagram illustrating a state in which the user has drawn an L-shaped line on the display surface.

In addition, for example, a case in Which bodies are placed on the display surface and the user has performed the gesture of drawing the L-shaped line between the bodies will be considered. FIG. 22A is an explanatory diagram illustrating a state in which the user has drawn an L-shaped line on the display surface. In this case, the gesture detection unit 220 detects that the gesture of drawing the L-shaped line has been performed, and the operation target detection unit 230 detects that the window 381 is an operation target of the gesture. However, rectangular parallelepiped bodies 383 and 384 are placed on the display surface, and visibility of the window 381 is degraded if the window 381 is caused to move as it is. Note that information regarding whether or not there is a body on the display surface and the position and the height of the body is acquired by the input unit 110.

Figure 22B:
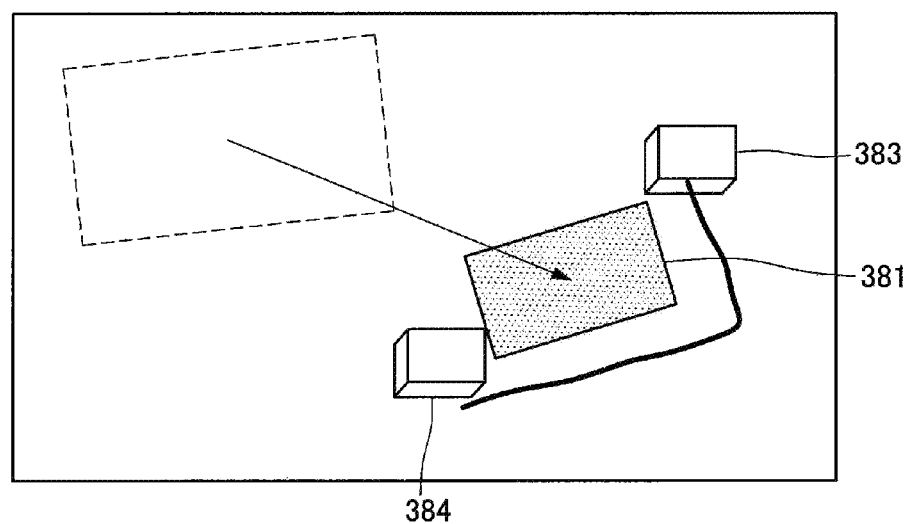
FIG. 22B is an explanatory diagram illustrating a state in which an effect of a gesture of drawing an L-shaped line has been provided to the window.

Thus, the effect invoking unit 250 decides to cause the window 381 to move to a gap between bodies 383 and 384 if the window 381 after movement, rotation, and deformation overlaps the surface of the bodies 383 and 384 at a proportion of a predetermined value or greater. FIG. 22B is an explanatory diagram illustrating a state in which the effect of the gesture of drawing the L-shaped line has been provided to the window 381 such that the window 381 is caused to move to the gap between the bodies 383 and 384. The effect invoking unit 250 can maintain visibility of the window 381 by moving and contracting the window 381 in this manner.

In a case in which a body is placed on the display surface, the effect invoking unit 250 may correct the parameter related to the graphics processing that is used when the effect is applied in accordance with how large the surface area of the body is, the number of bodies, the position at which the body is placed, and the like. In a case in which the shape is a planar shape, and the surface and the target object after movement overlap at a predetermined proportion or greater as the body 382 illustrated in FIGS. 21A and 21B, for example, the effect invoking unit 250 may correct the parameter such that the object overlaps the surface of the body. Also, in a case in which a plurality of bodies is placed on the display surface and a gesture has been performed between the bodies such as the body 382 as illustrated in FIGS. 21A and 21B, for example, the effect invoking unit 250 may correct the parameter such that the object moves between the bodies.

Figure 23A:
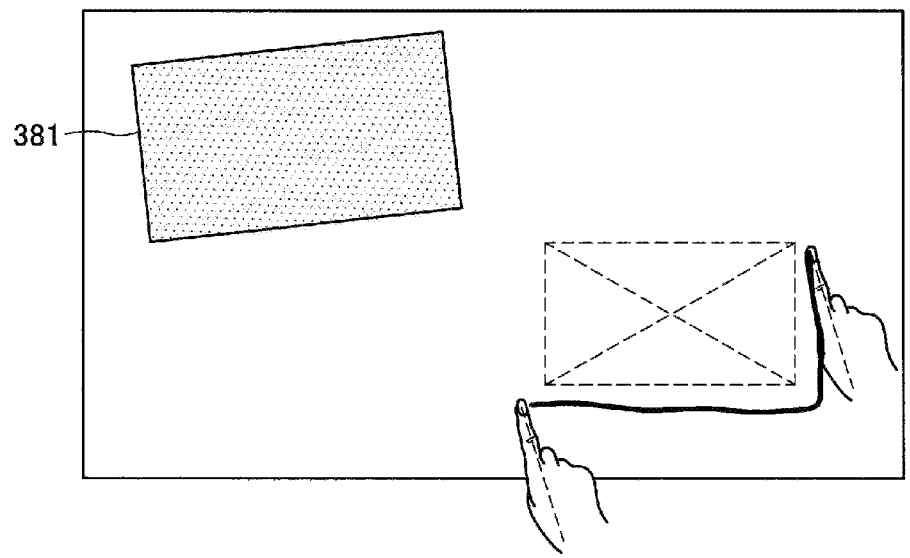
FIG. 23A is an explanatory diagram illustrating a state in which the user has drawn an L-shaped line on the display surface.

The effect invoking unit 250 may regard an orientation of the user's finger with which the gesture has been performed or the position of an arm root as an orientation in which the user is present and correct the parameter in accordance with the orientation of the user. FIG. 23A is an explanatory diagram illustrating a state in which the user has drawn the L-shaped line on the display surface. In this case, the gesture detection unit 220 detects that the gesture of drawing the L-shaped line has been performed, and the operation target detection unit 230 detects that the window 381 is an operation target of the gesture.

Figure 23B:
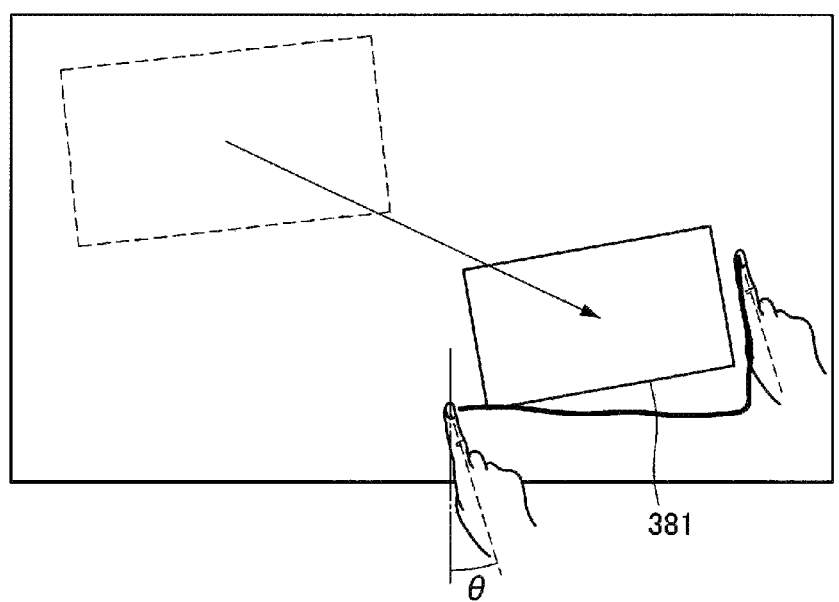
FIG. 23B is an explanatory diagram illustrating a state in which an effect of a gesture of drawing an L-shaped line has been provided to the window.

Then, the effect invoking unit 250 may correct a parameter of a rotational angle of the window 381 using information regarding the orientation of the user's linger with which the gesture has been performed or the position of the arm root, which has been recognized by the input unit 110. Although the target window is typically moved along the L-shaped line if the user draws the L-shaped line on the display surface, the effect invoking unit 250 corrects the rotational angle of the window 381 such that the user can easily perform an operation if it is predicted that the user is near a corner of the display screen from the information regarding the orientation of the finger of the user who has performed the gesture or the position of the arm root. FIG. 23B is an explanatory diagram illustrating a state in which an effect of a gesture of drawing an L-shaped line has been provided to the window 381. The effect invoking unit 250 can cause the window 381 to move such that the user can easily perform an operation as illustrated in FIG. 23B by correcting the rotational angle of the window 381 such that the user who has performed the gesture can easily perform an operation, for example.

The effect invoking unit 250 may determine whether or not to cause the object to move along the trajectory of the gesture or whether or not to correct the rotational angle in accordance with the user's position using an angular difference between the trajectory of the gesture and the orientation of the user. The effect invoking unit 250 may correct the rotational angle in accordance with the position of the user in a case in which an angle θ illustrated in FIG. 23B is equal to or greater than a predetermined value, and the effect invoking unit 250 may cause the object to move along the trajectory of the gesture in a case in which the angle θ is less than the predetermined value.

Figure 24A:
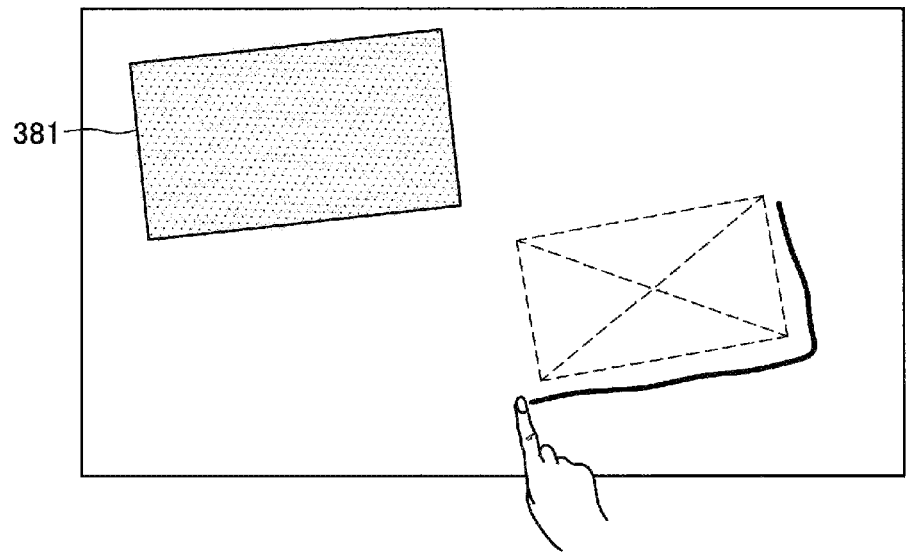
FIG. 24A is an explanatory diagram illustrating a state in which the user has drawn an L-shaped line on the display surface.

If it is known that the position of the user is near an end of the display surface, the effect invoking unit 250 may correct the parameter of the rotational angle of the object such that the object is caused to move to a position along the end of the display surface. FIG. 24A is an explanatory diagram illustrating a state in which the user has drawn the L-shaped line on the display surface. In this case, the gesture detection unit 220 detects that the gesture of drawing the L-shaped line has been performed, and the operation target detection unit 230 detects that the window 381 is an operation target of the gesture.

Figure 24B:
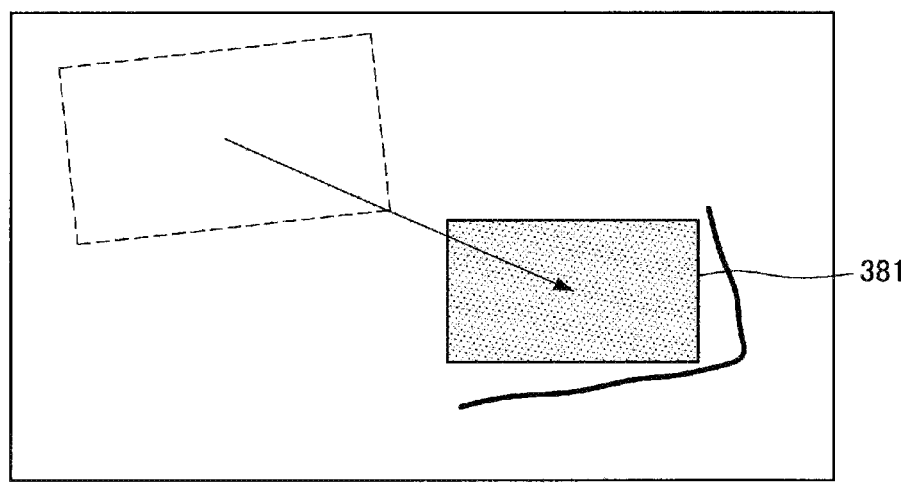
FIG. 24B is an explanatory diagram illustrating a state in which an effect of a gesture of drawing an L-shaped line has been provided to the window.

Then, the effect invoking unit 250 may correct a parameter of a rotational angle of the window 381 using information regarding the orientation of the user's finger with which the gesture has been performed or the position of the arm root, which has been recognized by the input unit 110. Although the target window is typically moved along the L-shaped line if the user draws the L-shaped line on the display surface, the parameter of the rotation angle of the window 381 is corrected such that the window 381 is caused to move to a position along the end of the display surface if it is predicted that the user is near a corner of the display surface from the information related to the orientation of the finger of the user who has performed the gesture or the position of the arm root. FIG. 24B is an explanatory diagram illustrating a state in which the effect of the gesture of drawing the L-shaped line has been provided to the window 381. The effect invoking unit 250 can cause the window 381 to move along the end of the display surface as illustrated in FIG. 24B by correcting the parameter of the rotational angle of the window 381 such that the window 381 is caused to move to the position along the end of the display surface.

In another case, how to cause the object to move, in other words, how the effect invoking unit 250 is to correct the parameter when the user performs a gesture may be decided using a user's trend or the like leaned through machine learning, for example. If it is discovered that a certain user frequently uses a specific window while placing it at a specific position, the effect invoking unit 250 may correct the parameter such that the specific window moves to the specific position if the user performs a gesture and the window is the target thereof.

In a case in which the input unit 110 can detect the angle in a height direction of the finger of the user who performs the gesture, the effect invoking unit 250 may correct a parameter when the effect is applied in accordance with the angle in the height direction of the finger. Hereinafter, a case in which a body with an angle is placed on the display surface and an object is moved to the body will be described as an example.

Figure 25A:
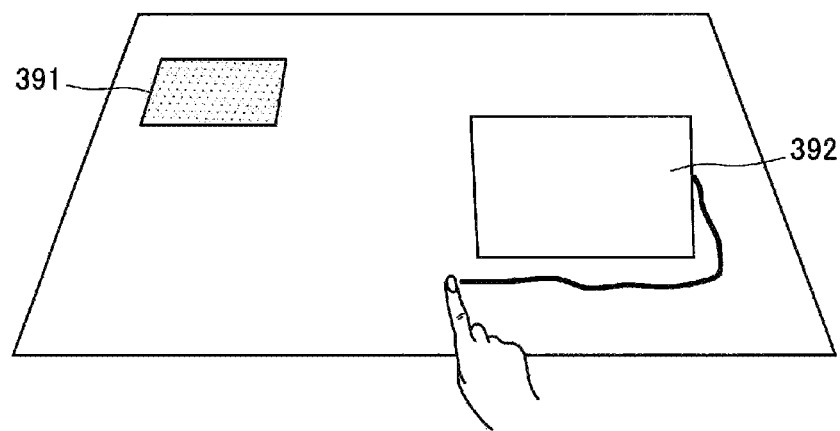
FIG. 25A is an explanatory diagram illustrating a state in which the user has drawn an L-shaped line on the display surface.

FIG. 25A is an explanatory diagram illustrating a state in which the user has drawn the L-shaped line on the display surface. In this case, the gesture detection unit 220 detects that the gesture of drawing the L-shaped line has been performed, and the operation target detection unit 230 detects that the window 391 is an operation target of the gesture. However, if the window 391 is caused to move to the vicinity of the L-shaped line as it is, the window 391 overlaps a body 392 placed on the display surface. The body 392 is assumed to be a body with a predetermined angle from the display surface rather than a planar shape.

In this case, if an operation of changing an angle of the finger relative to the display surface while the user keeps the finger in contact with the display surface (for example, a user's operation of lifting his/her palm while keeping his/her finger in contact with the display surface) is detected, the effect invoking unit 250 may correct the parameter such that the window 391 is deformed in accordance with the operation. The deformation is deformation of the shape of the window 391 to a rectangular (or square) shape or trapezoidal shape by changing the length of the upper side in a state in which the lower side of the window 391 is fixed.

Figure 25B:
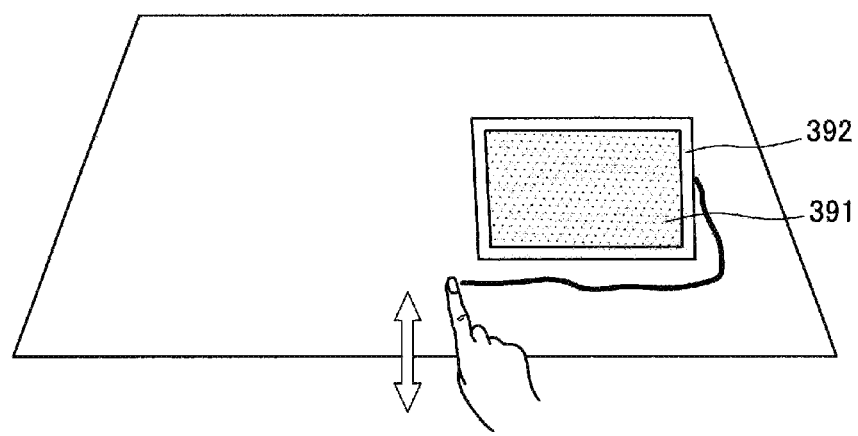
FIG. 25B is an explanatory diagram illustrating a state in which an effect of a gesture of drawing an L-shaped line has been provided to the window.

FIG. 25B is an explanatory diagram illustrating a state in which the user has drawn the L-shaped line on the display surface and then have brought down his/her finger on the front side while keeping his/her finger in contact with the display surface. If it is detected that the user has brought down his/her finger on the front side while keeping his/her finger in contact with the display surface, the effect invoking unit 250 corrects the parameter such that the window 391 that is being displayed on the surface of the body 392 is deformed in accordance with the operation. The effect invoking unit 250 can adjust the shape of the window 391 in accordance with the surface of the angled body 392 by correcting the parameter such that the window 391 is deformed in this manner.

The determination unit according to the disclosure corresponds to the gesture detection unit 220 and the target allocation unit 240, for example, and the effect decision unit according to the disclosure corresponds to the operation target detection unit 230, the target allocation unit 240, and the effect invoking unit 250, for example.

The functional configuration examples of the information processing system 100 according to the embodiment of the disclosure have been described above. Next, an operation example of the information processing system 100 according to the embodiment of the disclosure will be described.

[1.3. Operation Example]

Figure 26A:
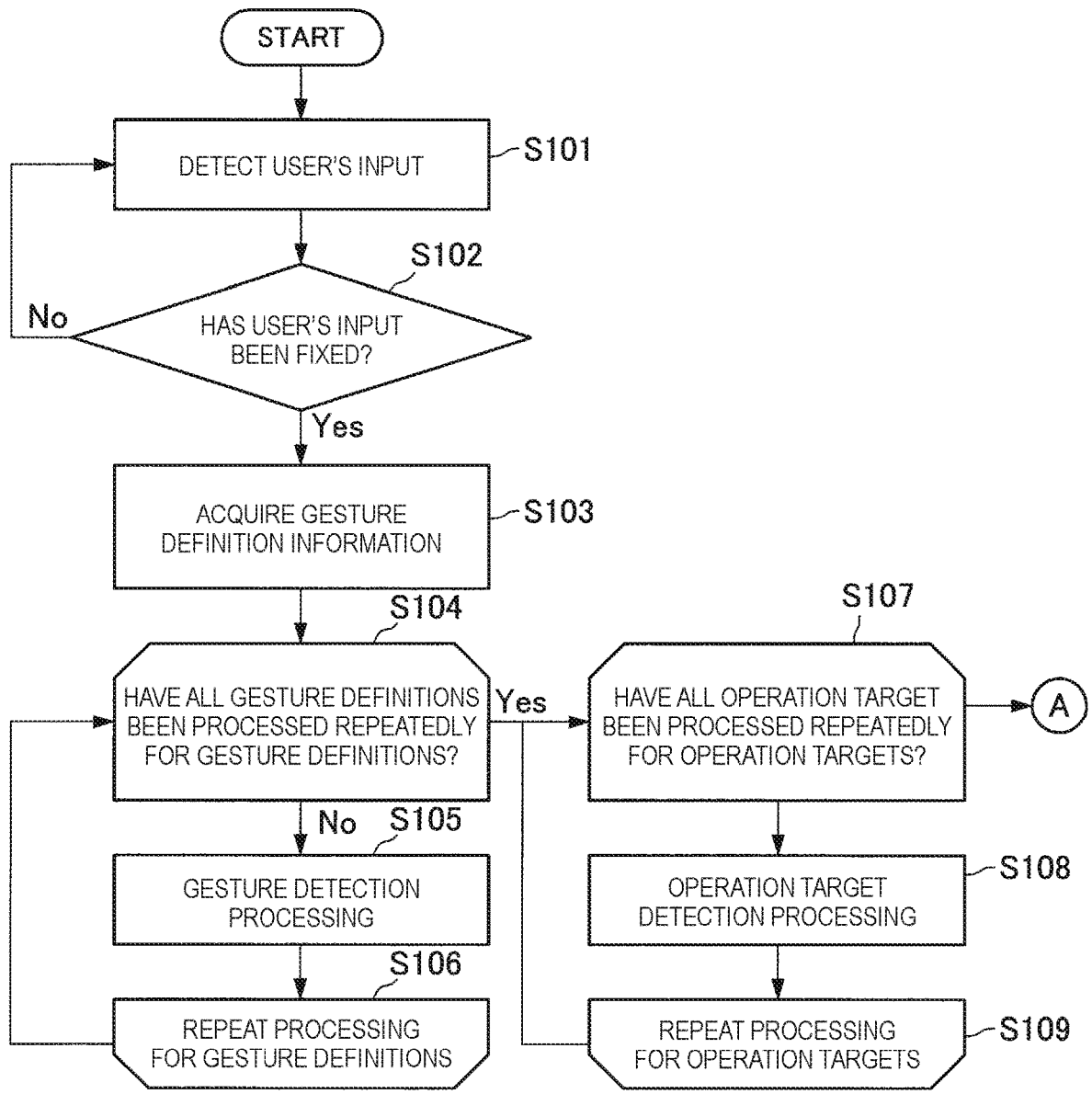
FIG. 26A is a flow diagram illustrating an operation example of the information processing system according to the embodiment.
Figure 26B:
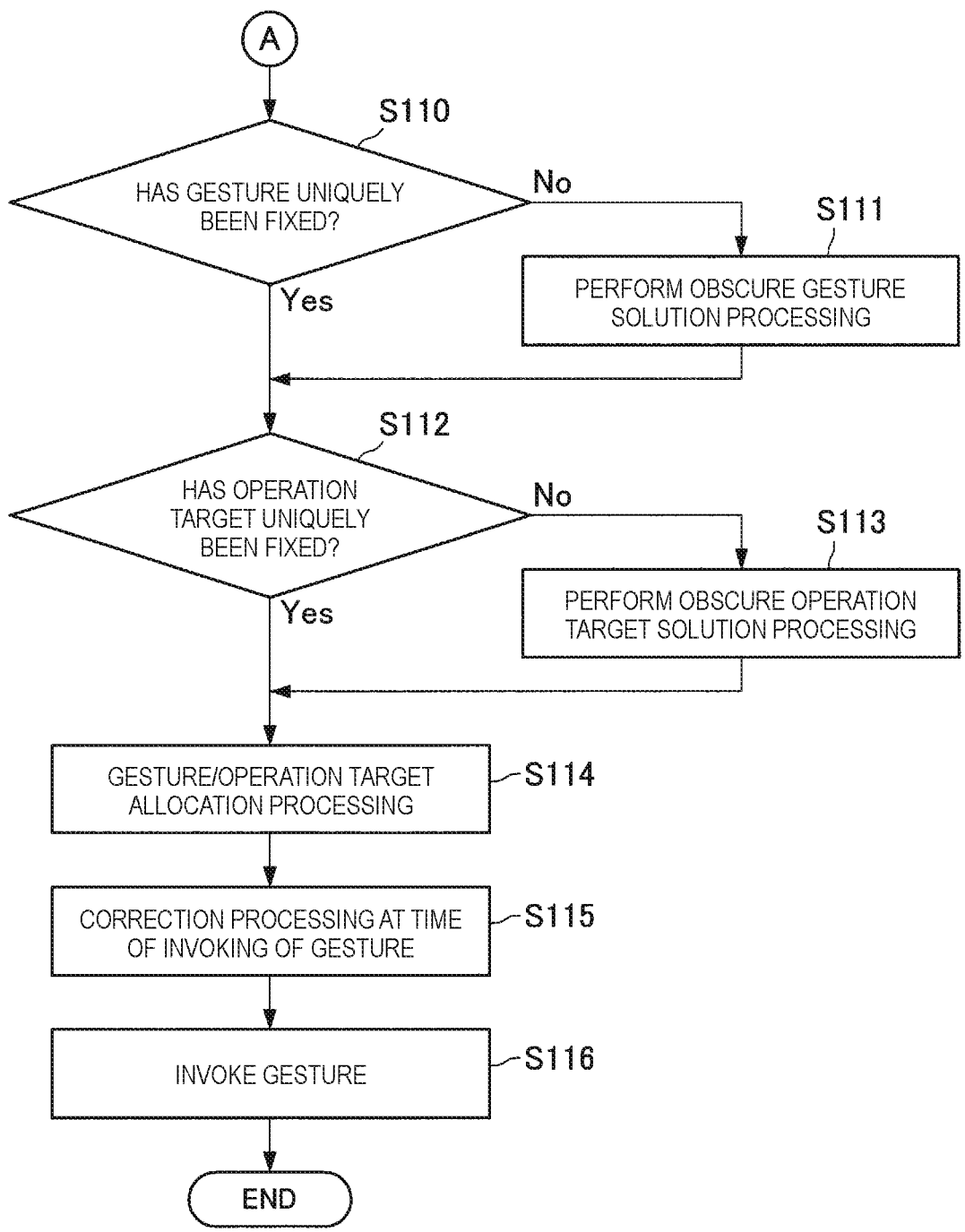
FIG. 26B is a flow diagram illustrating an operation example of the information processing system according to the embodiment.

FIGS. 26A and 26B are flow diagrams illustrating an operation example of the information processing system 100 according to the embodiment of the disclosure. Hereinafter, an operation example of the information processing system 100 according to the embodiment of the disclosure will be described with reference to FIGS. 26A and 26B.

If a user's input to the display surface is detected (Step S101), the information processing system 100 determines whether or not the user's input has been fixed (Step S102). If the user's input has not been fixed (Step S102; No), the information processing system 100 returns to the processing of detecting a user's input in Step S101. If a user's input has been fixed (Step S102; Yes), gesture definition information is acquired from the gesture definition accumulation unit 210 (Step S103). The information processing system 100 may determine that the user input has been fixed on the basis of separation of the finger after the user's operation of touching the display surface and may determine that the user input has been fixed if no change has occurred in a predetermined time at the position of the user's finger, for example. The determination regarding whether or not a user's input has been fixed is not limited to such examples. Also, the information processing system 100 may fix the gesture without waiting for the fixation of the input depending on the content of the user's input. If there is only one gesture through an input using two of the user's fingers in the gesture definitions accumulated in the gesture definition accumulation unit 210 and the user has performed an operation on the display surface with two of his/her fingers, for example, the information processing system 100 may determine that only the one gesture through the input using the two of his/Tier fingers has been performed and may move on to gesture detection processing, which will be described later, before the fixation of the input.

If the information processing system 100 acquires the gesture definition information from the gesture definition accumulation unit 210, then the information processing system 100 starts the gesture detection processing for the definition of the gesture using the acquired gesture definition information (Step S104). If the gesture detection processing has not been completed for all gesture definitions (Step S104; No), the information processing system 100 executes the gesture detection processing using the gesture detection unit 220 (Step S105), and if the gesture detection processing for a certain gesture definition is completed, the information processing system 100 moves on to the processing on the next gesture definition (Step S106). The gesture detection processing using the gesture detection unit 220 is as described above, and detailed description thereof will be omitted here.

If the processing has been completed on all the gesture definitions (Step S104; Yes), then the information processing system 100 starts operation target detection processing on all the displayed objects (Step S107). If the operation target detection processing has not been completed on all the objects (Step S107; No), the information processing system 100 executes operation target detection processing using the operation target detection unit 230 (Step S108), and if processing on a certain object has been completed, the information processing system 100 moves on to processing on the next object (Step S109). The operation target detection processing using the operation target detection unit 230 is as described above, and detailed description will be omitted here. An order of the operation target detection processing may be an ascending order of IDs applied to the objects, or the operation target detection processing may be successively performed from the object with a gravity center position located on the upper left side of the display screen, for example.

If the processing has been completed on all the objects (Step S107; Yes), the information processing system 100 performs processing of determining whether or not a gesture has uniquely been fixed by the target allocation unit 240 (Step S110). If the gesture has not uniquely been fixed, the information processing system 100 performs the obscure gesture solution processing using the target allocation unit 240 (Step S111). The obscure gesture solution processing using the target allocation unit 240 is as described above, and detailed description thereof will be omitted here.

Next, the information processing system 100 performs processing of determining whether or not an operation target has uniquely been fixed by the target allocation unit 240 (Step S112). If the operation target has not uniquely been fixed, the information processing system 100 performs obscure operation target solution processing using the target allocation unit 240 (Step S113). The obscure operation target solution processing using the target allocation unit 240 is as described above, and detailed description thereof will be omitted here.

If the gesture and operation target are fixed, the information processing system 100 executes gesture/operation target allocation processing using the target allocation unit 240 (Step S114). The gesture/operation target allocation processing using the target allocation unit 240 is as described above, and detailed description thereof will be omitted here.

If the gesture/operation target allocation processing is completed, then the information processing system 100 executes correction processing at the time of the invoking of the gesture using the effect invoking unit 250 (Step S115). The correction processing at the time of the invoking of the gesture using the effect invoking unit 250 is as described above, and detailed description thereof will be omitted here.

If the correction processing at the time of the invoking of the gesture is completed by the effect invoking unit 250, then the information processing system 100 invokes the gesture in accordance with the user's input (Step S116).

The information processing system 100 according to the embodiment of the disclosure can execute operations corresponding to a gesture in consideration of a utilization situation and an intention of the user by executing the aforementioned series of operations.

2. Hardware Configuration Example

Figure 27:
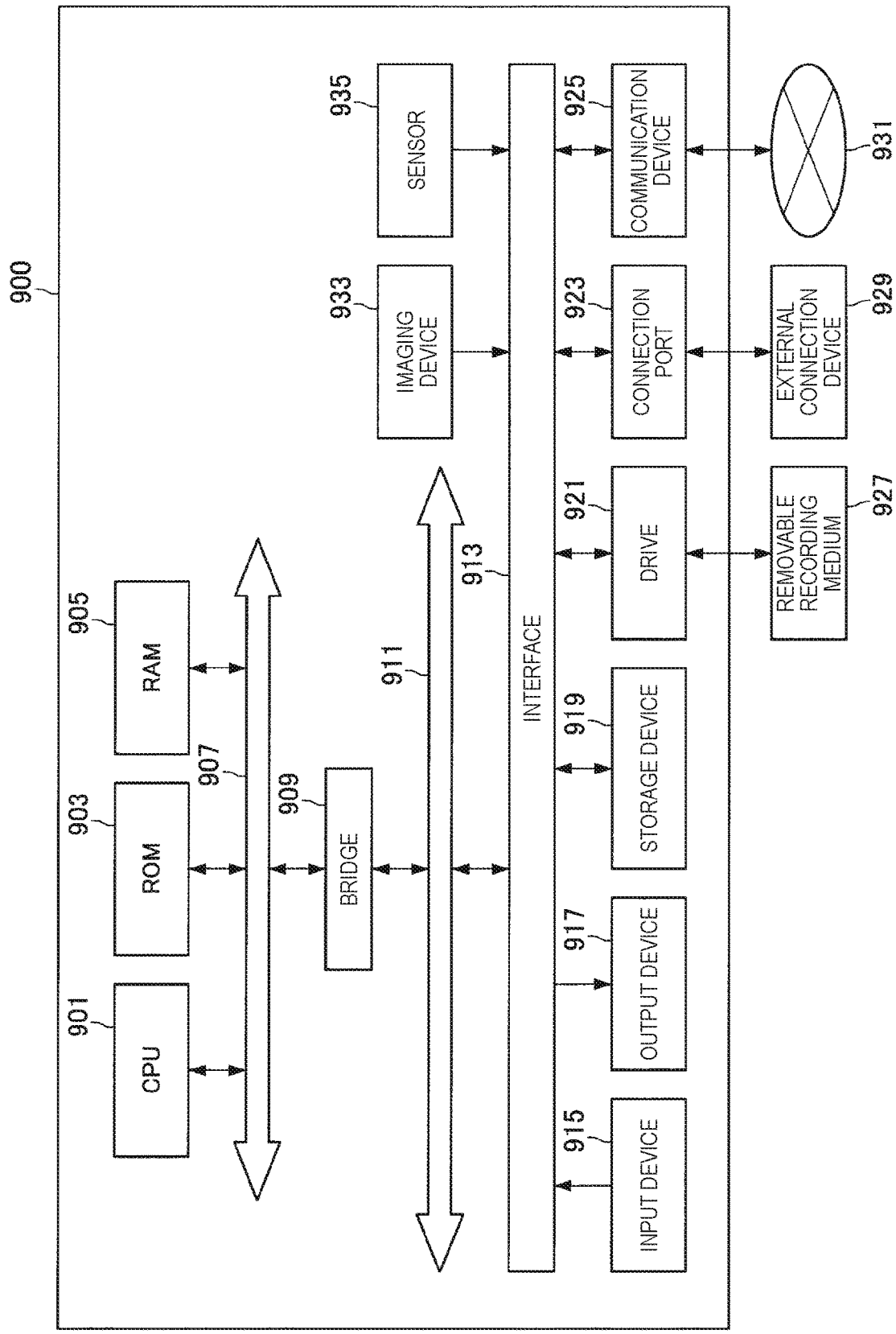
FIG. 27 is an explanatory diagram illustrating a hardware configuration example.

Next, a hardware configuration of the information processing system 100 according to an embodiment of the present disclosure will be described with reference to FIG. 27. FIG. 27 is a block diagram illustrating a hardware configuration example of the information processing system 100 according to an embodiment of the present disclosure.

As illustrated in FIG. 27, the information processing system 100 includes a central processing unit (CPU) 901, a read only memory (ROM) 903, and a random access memory (RAM) 905. In addition, the information processing system 100 may include a host bus 907, a bridge 909, an external bus 911, an interface 913, an input device 915, an output device 917, a storage device 919, a drive 921, a connection port 923, and a communication device 925. Further, the information processing system 100 may include an imaging device 933 and a sensor 935 as necessary. The information processing system 100 may include a processing circuit such as a digital signal processor (DSP) or an application specific integrated circuit (ASIC) instead of or in addition to the CPU 901.

The CPU 901 serves as an operation processing device and a control device, and controls all of or a part of the operations in the information processing system 100 in accordance with various programs recorded in the ROM 903, the RAM 905, the storage device 919 or a removable recording medium 927. The ROM 903 stores programs and operation parameters used by the CPU 901. The RAM 905 temporarily stores program used in the execution of the CPU 901 and parameters that changes as appropriate in the execution. The CPU 901, ROM 903, and RAM 905 are connected to each other by the host bus 907 including an internal bus such as a CPU bus. In addition, the host bus 907 is connected to the external bus 911 such as a peripheral component interconnect/interface (PCI) bus via the bridge 909.

The input device 915 is, for example, a device manipulated by a user with a mouse, a keyboard, a touch panel, buttons, switches, a lever, and the like. The input device 915 may include a mic that detects a sound of a user. The input device 915 may be, for example, a remote control unit using infrared light or other radio waves, or may be an external connection device 929 such as a portable phone operable in response to the manipulation of the information processing system 100. The input device 915 includes an input control circuit that generates an input signal on the basis of the information input by a user and outputs the input signal to the CPU 901. By manipulating the input device 915, a user can input various types of data to the information processing system 100 or issue instructions for causing the information processing system 100 to perform a processing operation. In addition, the imaging device 933 to be described below can function as an input device by imaging a motion or the like of a hand of the user.

The output device 917 includes a device capable of visually or audibly notifying a user of the acquired information. The output device 917 may be, for example, a display device such as a liquid crystal display (LCD), a plasma display panel (PDP), an organic electro-luminescence (EL) display, and a projector, a hologram display device, an audio output device, such as a speaker or a headphone, and a printer. The output device 917 outputs the results obtained from the process of the information processing system 100 in a form of video such as text or an image and in a form of voice such as voice or sound. In addition, the output device 917 may include a light or the like to brighten the surroundings.

The storage device 919 is a device for data storage configured as an example of a storage unit of the information processing system 100. The storage device 919 includes, for example, a magnetic storage device such as a hard disk drive (HDD), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing system 100 or externally attached thereto. The drive 921 reads information recorded in the attached removable recording medium 927 and outputs the information to the RAM 905. Further, the drive 921 writes record in the attached removable recording medium 927.

The connection port 923 is a port used to directly connect devices to the information processing system 100. The connection port 923 may be, for example, a universal serial bus (USB) port, an IEEE1394 port, a small computer system interface (SCSI) port, or the like. In addition, the connection port 923 may be an RS-232C port, an optical audio terminal, High-Definition Multimedia Interface (HDMI) (registered trademark) port, or the like. By connecting the external connection device 929 to the connection port 923, various data may be exchanged between the information processing system 100 and the external connection device 929.

The communication device 925 is, for example, a communication interface including a communication device or the like for connection to a communication network 931. The communication device 925 may be, for example, a communication card for a wired or wireless local area network (LAN), Bluetooth (registered trademark), wireless USB (WUSB), or the like. In addition, the communication device 925 may be a router for optical communication, a router for asymmetric digital subscriber line (ADSL), a modem for various kinds of communications, or the like. The communication device 925 transmits and receives signals to and from, for example, the Internet or other communication devices using a predetermined protocol such as TCP/IP. In addition, the communication network 931 to be connected to the communication device 925 is a network connected in a wired or wireless manner, and is, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal oxide semiconductor (CMOS), as well as various members such as one or more lenses for controlling the formation of a subject image on the image sensor, for example. The imaging device 933 may be a device that captures still images and may also be a device that captures moving images.

The sensor 935 is any of various sensors such as an acceleration sensor, a gyro sensor, a geomagnetic sensor, an optical sensor, or a sound sensor, for example. The sensor 935 acquires information regarding the state of the information processing system 100, such as the attitude of the case of the information processing system 100, as well as information regarding the environment surrounding the information processing system 100, such as brightness or noise surrounding the information processing system 100, for example. The sensor 935 may also include a global positioning system (GPS) sensor that receives GPS signals and measures the latitude, longitude, and altitude of the device.

The foregoing thus illustrates an exemplary hardware configuration of the information processing system 100. Each of the above components may be realized with general-purpose members or hardware specialized in the function of each component. Such a configuration may also be modified as appropriate in accordance with the technological level at the time of the implementation.

3. Conclusion

According to the embodiment of the disclosure, the information processing system 100 capable of detecting a user's gesture at least with a defined direction, which has been performed on the display surface, and executing processing in accordance with the user's gesture is provided as described above. The information processing system 100 according to the embodiment of the disclosure can execute processing in consideration of a user's intention when processing in accordance with a user's gesture is executed.

The respective steps in the processing executed by each apparatus described herein do not necessarily have to be performed chronologically in the order described in a sequence diagram or a flowchart. For example, the respective steps in the processing executed by each apparatus may be performed in order different from the order described in the flowcharts, or may be performed in parallel.

It is also possible to fabricate a computer program for causing hardware such as the CPU, ROM, and RAM built in each apparatus to implement the same functions as those of the structural elements of each apparatus. It is also possible to provide a storage medium having the computer program stored therein. The respective functional blocks described in the functional block diagram are configured with hardware, thereby allowing the series of processing to be implemented by the hard ware.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although various kinds of processing is executed by the user performing operations with his/her finger on the display screen in the aforementioned description, the disclosure is not limited to such an example. The finger is an example of the operation member according to the disclosure, a pen-type device such as a stylus may be used as an operation member instead of the finger. Note that the operation member means a member for executing operations on the display surface.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A display control device including:

a determination unit that determines content of a gesture from an operation that has been performed on a display surface; and an effect decision unit that decides an effect to set a disposition direction of a display object displayed on the display surface and the display object which is a target of the effect, that correspond to the gesture determined by the determination unit.

(2)

The display control device according to (1), in which the effect decision unit decides a disposition of the display object that is the target of the effect on the display surface on the basis of the decided effect.

(3)

The display control device according to (2), in which the operation is imaged by an imaging device, and the display object is displayed by a projection device that performs projection on a surface of a predetermined body.

(4)

The display control device according to any of (1) to (3), in which in a case in which the determination unit determines that two or more candidates are present as candidates for the gesture from the operation, the effect decision unit performs processing of deciding the effect on the basis of a plurality of candidates.

(5)

The display control device according to (4), in which in the case in which two or more candidates are present as the candidates for the gesture, the effect decision unit selects a common effect of a plurality of gestures that is estimated from the performed operation.

(6)

The display control device according to any of (1) to (5), in which in a case in which two or more candidates are present as candidates for the display object that is the target of the effect corresponding to the gesture that the determination unit has determined, the effect decision unit performs processing of deciding the display object that is the target on the basis of a plurality of candidates.

(7)

The display control device according to (6), in which in a case in which two or more candidates are present as candidates for the display object that is the target of the effect, the effect decision unit regards a display object that is positioned at a closest location to a location on which the operation has been performed as the display object that is the target.

(8)

The display control device according to any of (1) to (7), in which in a case in which a plurality of operations is simultaneously performed, the determination unit determines the gesture by placing priority on content of an operation that has been completed earlier.

(9)

The display control device according to (1) to (7), in which in a case in which a plurality of operations is simultaneously performed, the determination unit determines the gesture by placing priority on content of an operation that has been performed at a location that is close to the display object that is close to a target of the operation.

(10)

The display control device according to any of (1) to (9), in which in a case in which a plurality of operations is simultaneously performed, the determination unit determines the gesture by placing priority on content of an operation that has been performed by a last user among users who have touched the display object of the target, in which the effect is exhibited.

(11)

The display control device according to any of (1) to (10), in which in a case in which the operation is an operation of drawing a line on the display surface with an operation member, the determination unit determines that the gesture is for aligning, along the line, the display object with a center of gravity in a range of a perpendicular line of the line.

(12)

The display control device according to any of (1) to (11), in which in a case in which the operation is an operation of drawing a line on the display surface with an operation member, the determination unit determines that the gesture is for aligning all the display objects displayed on the display surface along the line.

(13)

The display control device according to any of (1) to (12), in which in a case in which the operation is an operation of drawing a first line in a first direction on the display surface with an operation member and subsequently drawing a second line in a second direction that is substantially a direction perpendicular to the first direction, the determination unit determines that the gesture is for causing at least the one display object to move to a position along the first line and causing the display object to be displayed in a disposition direction with reference to the second direction.

(14)

The display control device according to (13), in which the effect decision unit adjusts a display size of the display object to be moved in accordance with lengths of the first line and the second line.

(15)

The display control device according to any of (1) to (14), in which in a case in which the operation is an operation in a predetermined positional relationship with a physical object that is present on the display surface, the effect decision unit causes the display object to be displayed on the basis of a disposition position of the physical object.

(16)

The display control device according to (15), in which in a case in which the operation is an operation of drawing a line along the physical object, the effect decision unit causes the display object to be displayed on the physical object.

(17)

The display control device according to (15), in which in a case in which the operation is an operation of drawing a line between a plurality of the physical objects, the effect decision unit causes the display object to be displayed between the plurality of physical objects.

(18)

The display control device according to any of (1) to (17), in which the effect decision unit corrects display of the display object in accordance with a position of the user who performs the operation or an angle of a hand.

(19)

A display control method including, by a processor:

determining content of a gesture from an operation that has been performed on a display surface; and deciding an effect to set a disposition direction of a display object displayed on the display surface and the display object which is a target of the effect, that correspond to the determined gesture.

(20)

A computer program for causing a program to:

determine content of a gesture from an operation that has been performed on a display surface; and decide an effect to set a disposition direction of a display object displayed on the display surface and the display object which is a target of the effect, that correspond to the determined gesture.

REFERENCE SIGNS LIST

100 information processing system
200 display control unit

The invention claimed is:

1. A display control device comprising:
a determination unit configured to determine content of a single continuous gesture from an operation that has been performed on a display surface; and
an effect decision unit configured to decide
an effect to set a disposition direction and a disposition position of at least one display object displayed on the display surface, wherein the at least one display object is displayed on the display surface prior to the single continuous gesture, and
each display object which is a target of the effect,
wherein the effect decision unit decides the effect setting the disposition direction and the disposition position and decides each display object which is the target of the effect based on the single continuous gesture determined by the determination unit, and
wherein the determination unit and the effect decision unit are each implemented via at least one processor.

2. The display control device according to claim 1, wherein the effect decision unit decides a disposition of the at least one display object that is the target of the effect on the display surface based on the decided effect.

3. The display control device according to claim 2, wherein the operation is imaged by an imaging device, and the at least one display object is displayed by a projection device that performs projection on a surface of a predetermined body.

4. The display control device according to claim 1, wherein in a case in which the determination unit determines that two or more candidates are present as candidates for the gesture from the performed operation, the effect decision unit performs processing of deciding the effect based on a plurality of candidates.

5. The display control device according to claim 4, wherein in the case in which two or more candidates are present as the candidates for the gesture, the effect decision unit selects a common effect of a plurality of gestures that is estimated from the performed operation.

6. The display control device according to claim 1, wherein in a case in which two or more candidates are present as candidates for the at least one display object that is the target of the effect corresponding to the gesture that the determination unit has determined, the effect decision unit performs processing of deciding each display object that is the target on a basis of a plurality of candidates.

7. The display control device according to claim 6, wherein in a case in which two or more candidates are present as candidates for the at least one display object that is the target of the effect, the effect decision unit regards a display object that is positioned at a closest location to a location on which the operation has been performed as the display object that is the target.

8. The display control device according to claim 1, wherein in a case in which a plurality of operations is simultaneously performed, the determination unit determines the gesture by placing priority on content of an operation that has been completed earlier.

9. The display control device according to claim 1, wherein in a case in which a plurality of operations is simultaneously performed, the determination unit determines the gesture by placing priority on content of an operation that has been performed at a location that is close to the at least one display object that is the target of the effect.

10. The display control device according to claim 1, wherein in a case in which a plurality of operations is simultaneously performed, the determination unit determines the gesture by placing priority on content of an operation that has been performed by a last user among users who have touched the display object of the target, in which the effect is exhibited.

11. The display control device according to claim 1, wherein in a case in which the performed operation comprises drawing a line on the display surface with an operation member, the determination unit determines that the gesture is for aligning, along the line, the at least one display object with a center of gravity in a range of a perpendicular line of the drawn line.

12. The display control device according to claim 1, wherein in a case in which the performed operation comprises drawing a line on the display surface with an operation member, the determination unit determines that the gesture is for aligning all display objects displayed on the display surface along the line.

13. The display control device according to claim 1, wherein in a case in which the performed operation comprises drawing a first line in a first direction on the display surface with an operation member and subsequently drawing a second line in a second direction that is substantially a direction perpendicular to the first direction, the determination unit determines that the gesture is for causing the at least one display object to move to a position along the first line and causing the at least one display object to be displayed in the disposition direction with reference to the second direction.

14. The display control device according to claim 13, wherein the effect decision unit adjusts a display size of the at least one display object to be moved in accordance with lengths of the first line and the second line.

15. The display control device according to claim 1, wherein in a case in which the operation is performed in a predetermined positional relationship with a physical object that is present on the display surface, the effect decision unit causes the at least one display object to be displayed based on a disposition position of the physical object.

16. The display control device according to claim 15, wherein in a case in which the performed operation comprises drawing a line along the physical object, the effect decision unit causes the at least one display object to be displayed on the physical object.

17. The display control device according to claim 15, wherein in a case in which the performed operation comprises drawing a line between a plurality of physical objects, the effect decision unit causes the at least one display object to be displayed between the plurality of physical objects.

18. The display control device according to claim 1, wherein the effect decision unit corrects display of the at least one display object in accordance with a position of the user who performs the operation or an angle of a hand of the user.

19. A display control method comprising, by a processor:
determining content of a single continuous gesture from an operation that has been performed on a display surface; and
deciding
an effect to set a disposition direction and a disposition position of at least one display object displayed on the display surface, wherein the at least one display object is displayed on the display surface prior to the single continuous gesture, and
each display object which is a target of the effect,
wherein the deciding of the effect setting the disposition direction and the disposition position and the deciding of each display object which is the target of the effect are each based on the determined single continuous gesture.

20. A non-transitory computer-readable medium having embodied thereon a program, which when executed by a computer causes the computer to execute a method, the method comprising:
determining content of a single continuous gesture from an operation that has been performed on a display surface; and
deciding
an effect to set a disposition direction and a disposition position of at least one display object displayed on the display surface, wherein the at least one display object is displayed on the display surface prior to the single continuous gesture, and
each display object which is a target of the effect,
wherein the deciding of the effect setting the disposition direction and the disposition position and the deciding of each display object which is the target of the effect are each based on the single continuous determined gesture.

21. The display control device according to claim 1, wherein the effect decision unit decides the effect based on a number of fingers used to perform the operation on the display surface.

* * * * *